(12) United States Patent
Takahashi

(10) Patent No.: US 12,545,754 B2
(45) Date of Patent: Feb. 10, 2026

(54) POLYMER PARTICLES, THICKENER, AND COMPOSITION

(71) Applicant: SEKISUI KASEI CO., LTD., Osaka (JP)

(72) Inventor: Tomoyuki Takahashi, Osaka (JP)

(73) Assignee: SEKISUI KASEI CO., LTD., Osaka (JP)

(*) Notice: Subject to any disclaimer, the term of this patent is extended or adjusted under 35 U.S.C. 154(b) by 755 days.

(21) Appl. No.: 17/914,530

(22) PCT Filed: Sep. 30, 2020

(86) PCT No.: PCT/JP2020/037330
§ 371 (c)(1),
(2) Date: Sep. 26, 2022

(87) PCT Pub. No.: WO2021/199465
PCT Pub. Date: Oct. 7, 2021

(65) Prior Publication Data
US 2023/0143176 A1    May 11, 2023

(30) Foreign Application Priority Data
Mar. 30, 2020 (JP) .................. 2020-060220

(51) Int. Cl.
*C08F 120/14* (2006.01)
*C08F 2/18* (2006.01)
(Continued)

(52) U.S. Cl.
CPC ............. *C08F 120/14* (2013.01); *C08F 2/18* (2013.01); *C08F 6/04* (2013.01); *C08J 3/12* (2013.01);
(Continued)

(58) Field of Classification Search
None
See application file for complete search history.

(56) References Cited

U.S. PATENT DOCUMENTS 4,912,184 A * 3/1990 Akasaki .................. C08F 2/08
526/329.2
2018/0273696 A1* 9/2018 Goto .......................... C08F 2/26

FOREIGN PATENT DOCUMENTS

| JP | 6-43693 | 2/1994 |
| JP | 2019-127504 | 8/2019 |
| WO | 2017/056529 | 4/2017 |

OTHER PUBLICATIONS

International Search Report issued Dec. 22, 2020 in International (PCT) Application No. PCT/JP2020/037330.

* cited by examiner

*Primary Examiner* — Richard A. Huhn
(74) *Attorney, Agent, or Firm* — Wenderoth, Lind & Ponack, L.L.P.

(57) ABSTRACT

The present invention provides polymer particles capable of being dissolved in a dissolving medium without generating an unmixed lump and capable of uniformly improving the viscosity of a composition, and a thickener using the polymer particles. The polymer particles of the present invention have a number average particle diameter of 1 to 50 μm and a coefficient of variation in a number-based particle size distribution of 30% or more, wherein where the weight average molecular weight of the whole polymer particles is defined as A, the weight average molecular weight of small particles having a cumulative number percentage of 5% or less counted from the smaller diameter side in the number-based particle size distribution of the polymer particles is defined as B, and the weight average molecular weight of large particles having a particle diameter of 5 times or more (Continued)

the number average particle diameter of the polymer particles is defined as C, polymer particles satisfy the following formulas (1) and (2).

$$0.90 \leq (B/A) < 1.0 \qquad \text{Formula (1)}$$

$$(C/B) < 1.25 \qquad \text{Formula (2)}$$

7 Claims, 1 Drawing Sheet

(51) Int. Cl.
  *C08F 6/04* (2006.01)
  *C08J 3/12* (2006.01)
  *C09D 7/40* (2018.01)
  *C09D 7/43* (2018.01)
  *C09D 7/65* (2018.01)
(52) U.S. Cl.
  CPC ............... *C09D 7/43* (2018.01); *C09D 7/65* (2018.01); *C09D 7/69* (2018.01)

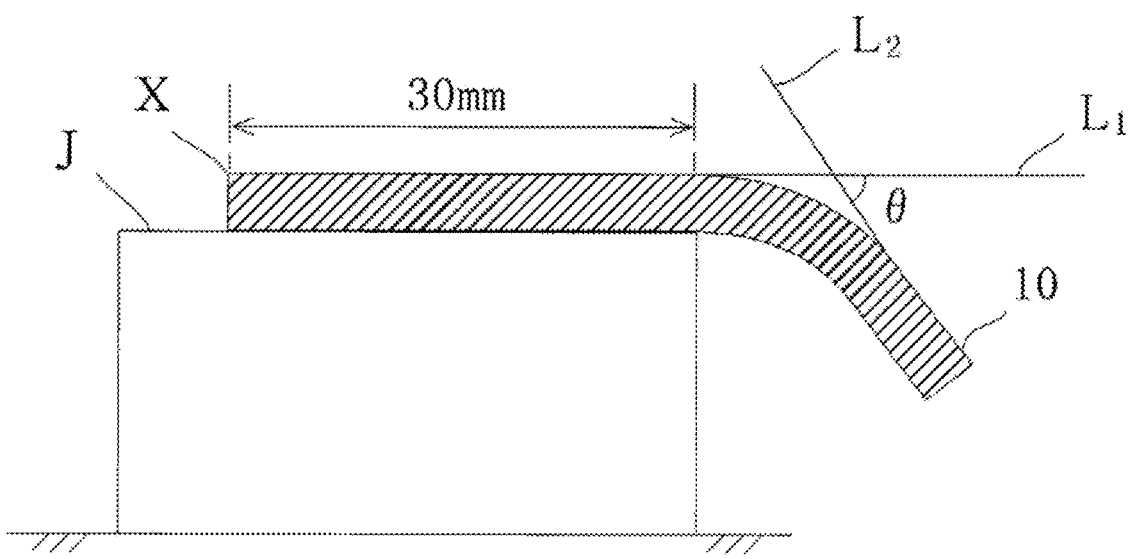

POLYMER PARTICLES, THICKENER, AND COMPOSITION

TECHNICAL FIELD

The present invention relates to polymer particles and a thickener containing the same.

BACKGROUND ART

Conventionally, compositions containing a dissolving medium (for example, a solvent) have been used as cosmetics, pharmaceuticals, adhesives, paints, and the like. In such a composition, the viscosity is adjusted by using a thickener according to an intended application. As the thickener, an organic thickener is suitably used because a high thickening effect can be obtained as compared with an inorganic thickener such as montmorillonite and silica.

As the organic thickener, polymer particles comprising a polymer such as carboxymethyl cellulose, polyvinyl alcohol, an acrylic-based polymer, sodium polyacrylate, polyvinyl pyrrolidone, polyvinyl methyl ether, and carboxyvinyl polymers are used. For example, Patent Literature 1 discloses that acrylic-based polymer particles having a particle diameter of 10 μm to 5 mm are used as a thickener.

CITATION LIST

Patent Literature

Patent Literature 1: Japanese Unexamined Patent Application, First Publication No. 2019-127504

SUMMARY OF INVENTION

Technical Problem

Polymer particles can exhibit a thickening effect by being dissolved in a dissolving medium. Polymer particles have a distribution in the particle size thereof and include a plurality of polymer particles differing in particle diameter. Hitherto, it has been considered that the molecular weight of polymer particles does not significantly vary even if the polymer particles differ in particle diameter. However, according to the study conducted by the present inventor, it has been found that the molecular weight of polymer particles varies depending on the particle diameter of the polymer particles, and the difference in the molecular weight of polymer particles increases as the particle diameter deviates from the average particle diameter, and as a result, a difference also occurs in solubility or thickening effect for each polymer particle.

When such polymer particles are dissolved in a dissolving medium, a low viscosity portion or a high viscosity portion is partially generated in the composition, and the viscosity in the composition becomes uneven. In such a case, even when the composition is stirred for a long time, it is difficult to make the viscosity in the composition uniform.

On the other hand, in order to make the solubility and thickening effect of polymer particles uniform, it is conceivable to use polymer particles having a narrow particle size distribution. In this case, however, since the dissolving behavior for each polymer particle is uniform, when the polymer particles are dissolved in a dissolving medium, the polymer particles start to dissolve all at once, which causes a rapid increase in viscosity of the composition, and a gel-like mass called an unmixed lump is likely to be generated before all the polymer particles are dissolved. The unmixed lump is generated when the surfaces of polymer particles are partially dissolved in a dissolving medium and these polymer particles adhere to each other. Since the surface of the unmixed lump is covered with a gel-like layer, the contact area between the polymer particles inside the unmixed lump and the dissolving medium is extremely reduced. Therefore, even if the composition is stirred for a long time, it is difficult to dissolve the polymer particles contained in the unmixed lump in the dissolving medium, and the unmixed lump remains in the composition.

As described above, when an unmixed lump is generated in the composition or the viscosity of the composition becomes non-uniform, there arise problems, for example, the applicability of the composition is deteriorated, or it is difficult to form an applied film being uniform in thickness, or a whitened portion is generated in the applied film to cause poor appearance.

Thus, the present invention provides polymer particles capable of being dissolved in a dissolving medium without generating an unmixed lump and capable of uniformly improving the viscosity of a composition, and a thickener and a composition both using the polymer particles.

Solution to Problem

[Polymer Particles]

As a result of intensive studies to solve the above-described problems, the present inventor has found that, by providing a prescribed difference in molecular weight in polymer particles having a prescribed spread in particle size distribution, the polymer particles can be gradually dissolved in a dissolving medium at an appropriate speed while suppressing a rapid increase in viscosity of a composition. Such polymer particles can be uniformly dissolved in a dissolving medium without generating an unmixed lump and can uniformly increase the viscosity of a composition. Therefore, according to the present invention, it is possible to provide polymer particles that exhibit superior thickening stability. Furthermore, according to the polymer particles of the present invention, it is also possible to, after uniformly increasing the viscosity of a composition, stably maintain a uniform state of the increased viscosity.

That is, the polymer particles of the present invention have a number average particle diameter of 1 to 50 μm and a coefficient of variation in a number-based particle size distribution of 30% or more, wherein where the weight average molecular weight of the whole polymer particles is defined as A, the weight average molecular weight of small particles having a cumulative number percentage of 5% or less counted from the smaller diameter side in the number-based particle size distribution of the polymer particles is defined as B, and the weight average molecular weight of large particles having a particle diameter of 5 times or more the number average particle diameter of the polymer particles is defined as C, polymer particles satisfy the following formulas (1) and (2).

$$0.90 \leq (B/A) < 1.0 \qquad \text{Formula (1)}$$

$$(C/B) < 1.25 \qquad \text{Formula (2)}$$

In the present invention, among polymer particles, polymer particles having a cumulative number percentage of 5% or less counted from the smaller diameter side in the number-based particle size distribution of the polymer particles are referred to as "small particles". Such small particles have a particle diameter equal to or less than a particle diameter (D5) at which the cumulative number percentage is 5% counted from the smaller diameter side in the number-based particle size distribution of the polymer particles.

In the present invention, the "polymer particles having a cumulative number percentage of X % counted from the smaller diameter side in the number-based particle size distribution of the polymer particles" refers to polymer particles having a particle diameter at which the cumulative number percentage is X % in the particle size distribution.

Furthermore, among the polymer particles, polymer particles having a particle diameter of 5 times or more the number average particle diameter of the polymer particles are referred to as "large particles".

The number average particle diameter of the polymer particles is 1 to 50 μm, preferably 2 to 30 μm, and more preferably 2 to 20 μm. When the number average particle diameter is 1 μm or more, the thickening effect of polymer particles is improved. When the number average particle diameter is 50 μm or less, the thickening effect of polymer particles is improved.

When polymer particles are used for a dental composition described later, the number average particle diameter of the polymer particles is 1 to 50 μm, preferably 10 to 50 μm, more preferably 15 to 48 μm, and still more preferably 20 to 48 μm. When the number average particle diameter is 1 μm or more, the thickening effect of the polymer particles on a dental composition is improved. When the number average particle diameter is 50 μm or less, the thickening effect of the polymer particles on a dental composition is improved.

The coefficient of variation in the number-based particle size distribution of the polymer particles is 30% or more, preferably 35% or more, and more preferably 40% or more. When the coefficient of variation is 30% or more, the polymer particles widely include polymer particles differing in particle diameter, and an appropriate difference in solubility can be provided for each particle diameter of the polymer particles. As a result, the polymer particles can be dissolved in the dissolving medium gradually from polymer particles having smaller particle diameter, and it becomes possible to suppress all the polymer particles from dissolving at once. Therefore, the polymer particles can be dissolved in the dissolving medium without generating an unmixed lump, and the polymer particles can uniformly increase the viscosity of a composition.

On the other hand, the coefficient of variation in the number-based particle size distribution of the polymer particles is preferably 80% or less, and more preferably 75% or less. When the coefficient of variation is 80% or less, the difference in solubility between the small particles and the large particles can be adjusted to fall in an appropriate range. When the difference in solubility between the small particles and the large particles is excessively large, the small particles dissolve in the dissolving medium in a short time, whereas it takes time for the dispersion medium to penetrate into the inside of the large particles, so that the large particles may not be dissolved sufficiently.

The polymer particles are adjusted such that a value (B/A) obtained by dividing the weight average molecular weight (B) of the small particles by the weight average molecular weight (A) of the whole polymer particles satisfies $0.90 \leq (B/A) < 1.0$ [Formula (1)]. The value (B/A) preferably satisfies $0.901 \leq (B/A) \leq 0.999$, and preferably satisfies $0.93 \leq (B/A) \leq 0.99$. When the value (B/A) is within the above range, a prescribed difference can be provided in the molecular weight of the polymer particles, so that the polymer particles can be dissolved in the dissolving medium gradually from polymer particles having smaller particle diameter, and it becomes possible to suppress all the polymer particles from dissolving at once. Therefore, the polymer particles can be dissolved in the dissolving medium without generating an unmixed lump, and the polymer particles can uniformly increase the viscosity of a composition.

The polymer particles are adjusted such that a value (C/B) obtained by dividing the weight average molecular weight (C) of the large particles by the weight average molecular weight (B) of the small particles satisfies $(C/B) < 1.25$ [Formula (2)]. The value (C/B) preferably satisfies $1 < (C/B) < 1.25$, more preferably satisfies $1.02 \leq (C/B) \leq 1.23$, and still more preferably satisfies $1.05 \leq (C/B) \leq 1.21$. When the value (C/B) is within the above range, a prescribed difference can be provided in the molecular weight of the polymer particles, so that the polymer particles can be dissolved in the dissolving medium gradually from polymer particles having smaller particle diameter, and it becomes possible to suppress all the polymer particles from dissolving at once. In this way, in the composition, thickening by the polymer particles can be stably performed over time while suppressing rapid thickening, and the viscosity of the composition can be uniformized.

In the polymer particles, a value (C/A) obtained by dividing the weight average molecular weight (C) of the large particles by the weight average molecular weight (A) of the whole polymer particles preferably satisfies the following formula (3).

$$1.0 < (C/A) \leq 1.10 \qquad \text{Formula (3)}$$

As described above, in the polymer particles, the value (C/A) preferably satisfies $1.0 < (C/A) \leq 1.10$ [Formula (3)], more preferably satisfies $1.01 \leq (C/A) \leq 1.10$, still more preferably satisfies $1.01 \leq (C/A) \leq 1.09$, and even more preferably satisfies $1.02 \leq (C/A) \leq 1.09$. When the value (C/A) is within the above range, a prescribed difference can be provided in the molecular weight of the polymer particles, so that the dissolution in the dissolving medium of the large particles can be made slower than that of polymer particles having a small particle diameter and it becomes possible to suppress all the polymer particles from dissolving at once. Therefore, the polymer particles can be dissolved in the dissolving medium without generating an unmixed lump, and the polymer particles can uniformly increase the viscosity of a composition.

The weight average molecular weight (A) of the whole polymer particles is preferably $100 \times 10^3$ to $2,000 \times 10^3$, and more preferably $200 \times 10^3$ to $1,500 \times 10^3$. When the weight average molecular weight (A) of the whole polymer particles is $100 \times 10^3$ or more, the thickening effect of the polymer particles can be improved. When the thickening effect of polymer particles is low, it may cause an increase in the amount of the polymer particles to be charged, which may be a factor of generating an unmixed lump when the polymer particles are charged into a dissolving medium. When the weight average molecular weight (A) of the whole polymer particles is $2,000 \times 10^3$ or less, the time required for dissolving the polymer particles in the dissolving medium can be appropriately shortened. Furthermore, when the weight average molecular weight (A) of the whole polymer particles is $2,000 \times 10^3$ or less, superior solubility of the large particles in the dissolving medium can be secured, whereby the difference in solubility between the small particles and the large particles can be adjusted to fall in an appropriate range. When the difference in solubility between the small particles and the large particles is excessively large, the small particles dissolve in the dissolving medium in a short time, whereas it takes time for the dispersion medium to penetrate into the inside of the large particles, so that the large particles may not be dissolved sufficiently or the large particles attach to each other to form an unmixed lump.

The weight average molecular weight (B) of the small particles contained in the polymer particles is preferably $90 \times 10^3$ to $1,800 \times 10^3$, more preferably $180 \times 10^3$ to $1,500 \times 10^3$, still more preferably $180 \times 10^3$ to $1,430 \times 10^3$, and particularly preferably $180 \times 10^3$ to $1,400 \times 10^3$. When the weight average molecular weight (B) of the small particles is $90 \times 10^3$ or more, it is possible to suppress the dissolution rate of the small particles from becoming excessively high. If the dissolution rate of the small particles is excessively high, the small particles may be dissolved in the dissolving medium before being uniformly dispersed in the dissolving medium, and a highly viscous portion may be locally generated in the composition. In such a case, polymer particles having a particle diameter larger than that of the small particles may be caught by a highly viscous portion existing locally in the composition before being completely dissolved, so that an unmixed lump may be generated. In addition, when the weight average molecular weight (B) of the small particles is $1,800 \times 10^3$ or less, the polymer particles can be dissolved in the dissolving medium gradually from polymer particles having smaller particle diameter.

The weight average molecular weight (C) of the large particles contained in the polymer particles is preferably $110 \times 10^3$ to $2,200 \times 10^3$, and more preferably $220 \times 10^3$ to $1,600 \times 10^3$. When the weight average molecular weight (C) of the large particles is $110 \times 10^3$ or more, a difference in solubility can be provided for each particle diameter of the polymer particles, whereby the polymer particles can be dissolved in the dissolving medium gradually from polymer particles having smaller particle diameter. In addition, when the weight average molecular weight (C) of the large particles is $2,200 \times 10^3$ or less, superior solubility of the large particles in the dissolving medium can be secured, whereby the difference in solubility between the small particles and the large particles can be adjusted to fall in an appropriate range.

As described above, the polymer particles include a plurality of polymer particles differing in particle diameter from each other. The polymer particles have a prescribed difference in the molecular weight of the polymer in the polymer particles by satisfying the relationships of the above formulas (1) and (2). In such particles, it is preferable that the molecular weight of the polymer contained in the polymer particles also increases as the particle diameter of the polymer particles increases while satisfying the relationships of the above formulas (1) and (2). The polymer particles in which the molecular weight of the polymer gradually increases as the particle diameter increases while providing a prescribed difference in the molecular weight of the polymer as described above can suppress a rapid increase of the viscosity of a resulting composition when the polymer particles are dissolved in a dissolving medium to increase the viscosity, and can increase the viscosity of the composition at an appropriate rate, so that the polymer particles can exhibit more improved thickening stability.

When the weight average molecular weight of "first intermediate particles having a cumulative number percentage of more than 20% and 50% or less counted from the smaller diameter side in the number-based particle size distribution of the polymer particles" is defined as D, among the polymer particles, a value (D/A) obtained by dividing the weight average molecular weight (D) of the first intermediate particles by the weight average molecular weight (A) of the whole polymer particles preferably satisfies the following formula (4).

$$0.93 < (D/A) < 1.00 \quad \text{Formula (4)}$$

In the polymer particles, the above value (D/A) preferably satisfies $0.93 < (D/A) < 1.00$ [Formula (4)], more preferably satisfies $0.96 < (D/A) < 1.00$, still more preferably satisfies $0.97 \leq (D/A) < 1.00$, and even more preferably satisfies $0.97 < (D/A) < 1.00$. When the value (D/A) is within the above range, a prescribed difference can be provided in the molecular weight of the polymer particles, so that the polymer particles can be dissolved in the dissolving medium gradually from polymer particles having smaller particle diameter and it becomes possible to suppress all the polymer particles from dissolving at once. Therefore, the polymer particles can be dissolved in the dissolving medium without generating an unmixed lump, and the polymer particles can uniformly increase the viscosity of a composition.

In the polymer particles, the weight average molecular weight (D) of the first intermediate particles is preferably larger than the weight average molecular weight (B) of the small particles. It is preferable that a value (D/B) obtained by dividing the weight average molecular weight (D) of the first intermediate particle by the weight average molecular weight (B) of the small particle satisfies the following formula (5).

$$1.0 < (D/B) < 1.1 \quad \text{Formula (5)}$$

In the polymer particles, the value (D/B) preferably satisfies $1.0 < (D/B) < 1.1$, and more preferably satisfies $1.001 < (D/B) < 1.081$. When the above value (D/B) satisfies the above formula (5), the polymer particles can be dissolved in the dissolving medium gradually from polymer particles having smaller particle diameter, and it becomes possible to suppress all the polymer particles from dissolving at once.

When the weight average molecular weight of the "second intermediate particles having a cumulative number percentage of more than 50% and 80% or less counted from the smaller diameter side in the number-based particle size distribution of the polymer particles" is defined as E, in the polymer particles, a value (E/A) obtained by dividing the weight average molecular weight (E) of the second intermediate particles by the weight average molecular weight (A) of the whole polymer particles preferably satisfies the following formula (6).

$$1.00 < (E/A) < 1.08 \quad \text{Formula (6)}$$

In the polymer particles, the above value (E/A) preferably satisfies $1.00 < (E/A) < 1.08$ [Formula (6)], more preferably satisfies $1.00 < (E/A) \leq 1.07$, and still more preferably satisfies $1.01 \leq (E/A) \leq 1.06$. When the value (E/A) is within the above range, a prescribed difference can be provided in the molecular weight of the polymer particles, so that the polymer particles can be dissolved in the dissolving medium gradually from polymer particles having smaller particle diameter and it becomes possible to suppress all the polymer particles from dissolving at once. Therefore, the polymer particles can be dissolved in the dissolving medium without generating an unmixed lump, and the polymer particles can uniformly increase the viscosity of a composition.

In the polymer particles, the weight average molecular weight (E) of the second intermediate particles is preferably larger than the weight average molecular weight (D) of the first intermediate particles. It is preferable that a value (E/D)

obtained by dividing the weight average molecular weight (E) of the second intermediate particles by the weight average molecular weight (D) of the first intermediate particles satisfies the following formula (7).

$$1.0<(E/D)<1.2 \quad \text{Formula (7)}$$

In the polymer particles, the above value (E/D) preferably satisfies $1.0<(E/D)<1.2$, more preferably satisfies $1.01\leq(E/D)<1.15$, and still more preferably satisfies $1.01\leq(E/D)<1.10$. When the above value (E/D) satisfies the above formula (7), the polymer particles can be dissolved in the dissolving medium gradually from polymer particles having smaller particle diameter, and it becomes possible to suppress all the polymer particles from dissolving at once.

In addition, in the polymer particles, the weight average molecular weight (C) of the large particles is preferably larger than the weight average molecular weight (E) of the second intermediate particles. It is preferable that a value (C/E) obtained by dividing the weight average molecular weight (C) of the large particles by the weight average molecular weight (E) of the second intermediate particles satisfies the following formula (8).

$$1.0<(C/E)<1.1 \quad \text{Formula (8)}$$

In the polymer particles, the above value (C/E) preferably satisfies $1.0<(C/E)<1.1$, and more preferably satisfies $1.00<(C/E)<1.06$. When the above value (C/E) satisfies the above formula (8), the polymer particles can be dissolved in the dissolving medium gradually from polymer particles having smaller particle diameter, and it becomes possible to suppress all the polymer particles from dissolving at once.

In the present invention, when calculating each of the value (B/A) in the above formula (1), the value (C/B) in the above formula (2), the value (C/A) in the above formula (3), the value (D/A) in the above formula (4), the value (D/B) in the above formula (5), the value (E/A) in the above formula (6), the value (E/D) in the above formula (7), and the value (C/E) in the above formula (8), it is determined whether each of the above formulas (1) to (8) is satisfied using an indivisible value when the calculated value is indivisible, or using a value actually calculated without rounding after the decimal point of the indivisible value when the calculated value is indivisible. In Tables 1 and 2 in Examples described later, for convenience, values obtained by rounding each of the value (B/A), the value (C/B), the value (C/A), the value (D/A), the value (D/B), the value (E/A), the value (E/D), and the value (C/E) at the fourth decimal place are described.

In the present invention, among polymer particles, polymer particles having a cumulative number percentage of more than 20% and 50% or less counted from the smaller diameter side in the number-based particle size distribution of the polymer particles are referred to as "first intermediate particles". Polymer particles having a cumulative number percentage of more than 50% and 80% or less counted from the smaller diameter side in the number-based particle size distribution of the polymer particles are referred to as "second intermediate particles".

The weight average molecular weight (D) of the first intermediate particles is preferably $95\times10^3$ to $1,900\times10^3$, and more preferably $185\times10^3$ to $1,450\times10^3$. When the weight average molecular weight (D) of the first intermediate particle is within the above range, a difference in solubility can be provided for each particle diameter of the polymer particles, whereby the polymer particles can be dissolved in the dissolving medium gradually from polymer particles having smaller particle diameter.

The weight average molecular weight (E) of the second intermediate particle is preferably $115\times10^3$ to $2,100\times10^3$, and more preferably $210\times10^3$ to $1,550\times10^3$. When the weight average molecular weight (E) of the second intermediate particle is within the above range, a difference in solubility can be provided for each particle diameter of the polymer particles, whereby the polymer particles can be dissolved in the dissolving medium gradually from polymer particles having smaller particle diameter.

The particle diameter (D5) of the polymer particles is preferably 1 to 10 μm, more preferably 1 to 7 μm, and still more preferably 1 to 5 μm. When the particle diameter (D5) is 1 μm or more, the surface area per unit volume of the small particles is moderately increased to increase the degree of contact with the dissolving medium, and the polymer particles are easily dissolved in the dissolving medium without generating an unmixed lump. When the particle diameter (D5) is 10 μm or less, the dissolving medium easily permeates into the small particles. The particle diameter (D5) of polymer particles means a particle diameter corresponding to a cumulative number percentage of 5% counted from the smaller diameter side in the number-based particle size distribution of the polymer particles.

The content of the large particles in the polymer particles is preferably 0.1% or less, more preferably 0.08% or less, and still more preferably 0.05% or less on a number basis. By adjusting the content of the large particles to 0.1% or less, the generation of a highly viscous portion in the composition due to the large particles can be reduced. This makes it possible to increase the viscosity of the composition more uniformly and to stably maintain a uniform state of the increased viscosity. The content of the large particles is a percentage on a number basis, that is, a value indicating a ratio of the number of large particles to the total number of the polymer particles in percentage (100×(the number of large particles)/(the total number of polymer particles)).

The content of the large particles in the polymer particles is preferably 0.005% or more, and more preferably 0.01% or more on a number basis. By adjusting the content of the large particles to 0.005% or more, the difference in solubility between the small particles and the large particles can be made to fall in an appropriate range. As a result, the polymer particles can be dissolved in the dissolving medium gradually from polymer particles having smaller particle diameter, and it becomes possible to suppress all the polymer particles from dissolving at once.

It is preferable that the large particles are contained in a range in which the cumulative number percentage is 95% or more counted from the small diameter side in the number-based particle size distribution of the polymer particles.

The number-based particle size distribution of the polymer particles may be measured using a general-purpose measuring device. The number-based particle size distribution of the polymer particles is measured by, for example, a Coulter Multisizer (registered trademark) 3 (a measuring device manufactured by Beckman Coulter, Inc.). The measurement is performed using an aperture calibrated in accordance with Multisizer (registered trademark) 3 User's Manual issued by Beckman Coulter, Inc.

The aperture used for the measurement is appropriately selected according to the size of the polymer particles to be measured. The Current (aperture current) and Gain are appropriately set according to the size of the selected aperture. For example, when the aperture having a size of 50 m is selected, the Current (aperture current) is set to −800 and the Gain is set to 4.

As a sample for measurement, a dispersion liquid obtained by dispersing 0.1 g of polymer particles in 10 mL of a 0.1% by mass aqueous nonionic surfactant solution using a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR Co.) is used. During the measurement, the inside of the beaker is gently stirred to such an extent that air bubbles do not enter, and the measurement is terminated at the time when 100,000 polymer particles are measured, and a number-based particle size distribution is obtained.

Then, based on the obtained particle size distribution, a particle diameter (D5) corresponding to a cumulative number percentage of 5% on a number basis counted from the small diameter side is calculated.

In addition, based on the obtained particle size distribution, a particle diameter corresponding to a number-based cumulative number percentage of 50% counted from the small diameter side is calculated as the "number average particle diameter of polymer particles". Then, based on the obtained particle size distribution, the coefficient of variation (CV) in the number-based particle size distribution of the polymer particles is calculated based on the following formula.

Coefficient of variation (%)=(standard deviation of number-based particle size distribution of polymer particles)÷(number average particle diameter of polymer particles)×100

In addition, the content (%) of large particles having a particle diameter of 5 times or more the number average particle diameter is calculated based on the obtained particle size distribution.

The weight average molecular weight of the whole polymer particles is the weight average molecular weight of the polymer contained in the whole polymer particles and can be measured using GPC (gel permeation chromatography). The weight average molecular weight referred to herein means a weight average molecular weight in terms of polystyrene. Specifically, 0.003 g of polymer particles as a sample are dissolved in 10 mL of tetrahydrofuran (THF) at room temperature over 24 hours or more, and then the solution is filtered through a non-aqueous 0.45 μm chromatography disk to obtain a measurement liquid, and the weight average molecular weight of the whole polymer particles is determined from a calibration curve of standard polystyrene prepared in advance. Then, five measurement liquids are prepared in accordance with the above-described manner, GPC measurement is performed for each measurement liquid, and the weight average molecular weight of the whole polymer particles contained in each measurement liquid is measured. An arithmetic mean value of the five measured values thus obtained is determined, and a value obtained by rounding the arithmetic mean value to the nearest thousand is taken as a "weight average molecular weight (A) of the whole polymer particles". The measurement conditions of the chromatograph are as follows.

Device: High performance GPC device
Trade name: HLC-8320GPC EcoSEC-WorkStation (built-in RI detector) manufactured by Tosoh Corporation
Analysis conditions
Column: TSKgel SuperHZM-H×2 columns (4.6 mm I.D.×15 cm L×2)
Guard column: TSKguardcolumn SuperHZ-H×1 (4.6 mm I.D.×2 cm L)
Flow rate: sample side: 0.175 mL/min, reference side: 0.175 mL/min
Detector: built-in RI detector
Concentration: 0.3 g/L
Injection amount: 50 μL
Column temperature: 40° C.
System temperature: 40° C.
Eluent: THF (Preparation of Calibration Curve)

As standard polystyrene samples for calibration curves, standard polystyrene samples having weight average molecular weights of 500, 2,630, 9,100, 37,900, 102,000, 355,000, 3,840,000, and 5,480,000 of trade name "TSK standard POLYSTYRENE" manufactured by Tosoh Corporation and standard polystyrene samples having weight average molecular weight of 1,030,000 of trade name "Shodex STANDARD" manufactured by Showa Denko K.K. are used.

A method for preparing a calibration curve is as follows. First, the standard polystyrene samples for calibration curve are grouped into Group A (samples having a weight average molecular weight of 1,030,000), Group B (samples having a weight average molecular weight of 500, 9,100, 102,000 and 3,480,000), and Group C (samples having a weight average molecular weight of 2,630, 37,900, 355,000 and 5,480,000). 5 mg of a standard polystyrene sample having a weight average molecular weight of 1,030,000, which belongs to Group A, is weighed, then dissolved in 20 mL of THF, and 50 μL of the obtained solution is injected into a sample-side column. 10 mg, 5 mg, 5 mg, and 5 mg of standard polystyrene samples having weight average molecular weights of 500, 9,100, 102,000, and 3,480,000, which belong to Group B, are weighed respectively, and then dissolved in 50 mL of THF, and 50 μL of the obtained solutions are injected into the sample-side column. 5 mg, 5 mg, 5 mg, and 1 mg of standard polystyrene samples having weight average molecular weights of 2,630, 37,900, 355,000, and 5,480,000, which belong to Group C, are weighed respectively, and then dissolved in 40 mL of THF, and 50 μL of the obtained solutions are injected into the sample-side column. On the basis of the retention times of these standard polystyrene samples, a calibration curve (cubic formula) is created using the HLC-8320 GPC dedicated data analysis program GPC workstation (EcoSEC-WS), and this is used as a calibration curve for polystyrene-equivalent weight average molecular weight measurement.

The weight average molecular weight of the small particles is the weight average molecular weight of the polymer contained in the small particles. The weight average molecular weight of the large particles is the weight average molecular weight of the polymer contained in the large particles. The weight average molecular weight of each of the small particles and the large particles refers to a value measured using GPC. The polymer particles are classified in a common manner to collect small particles or large particles contained in the polymer particles, and then the weight average molecular weight of the small particles or the weight average molecular weight of the large particles can be measured in the same manner as in the method for measuring the weight average molecular weight of the whole polymer particles described above.

The weight average molecular weight of the first intermediate particles is the weight average molecular weight of the polymer contained in the first intermediate particles. The weight average molecular weight of the second intermediate particles is the weight average molecular weight of the polymer contained in the second intermediate particles. The weight average molecular weight of each of the first intermediate particles and the second intermediate particles refers to a value measured using GPC. The polymer particles are classified in a common manner to collect first intermediate particles or second intermediate particles contained in the polymer particles, and then the weight average molecular weight of the first intermediate particles or the weight average molecular weight of the second intermediate particles can be measured in the same manner as in the method for measuring the weight average molecular weight of the whole polymer particles described above.

The polymer particles of the present invention comprise a polymer. Examples of the polymer include cellulose-based polymers such as carboxymethyl cellulose, methyl cellulose, and hydroxyethyl cellulose, polyvinyl-based polymers such as polyvinyl alcohol, polyvinyl pyrrolidone, and polyvinyl benzyl ether copolymers, acrylic-based polymers, and styrene-based polymers. Among them, acrylic-based polymers and styrene-based polymers are preferable, and acrylic-based polymers are more preferable because polymer particles superior in thickening effect, solvent resistance, water resistance, chemical resistance, and/or the like can be obtained. Such polymers may be used alone or in combination of two or more kinds thereof.

The acrylic-based polymer is a polymer of a feedstock monomer comprising an acrylic-based monomer in an amount of preferably 50% by mass or more. The acrylic-based monomer is not particularly limited, and examples thereof include an acrylate, acrylic acid, a methacrylate, methacrylic acid, and the like. Such acrylic-based monomers may be used alone or in combination of two or more kinds thereof.

Examples of the acrylate include alkyl acrylates such as methyl acrylate, ethyl acrylate, propyl acrylate, n-butyl acrylate, and isobutyl acrylate. Examples of the methacrylate include alkyl methacrylates such as methyl methacrylate, ethyl methacrylate, propyl methacrylate, n-butyl methacrylate, and isobutyl methacrylate. Among them, methacrylates are preferable, alkyl methacrylates are more preferable, and methyl methacrylate, ethyl methacrylate, n-butyl methacrylate, and isobutyl methacrylate are still more preferable.

The content of the acrylic-based monomer component in the acrylic-based polymer is preferably 50% by mass or more, more preferably 80% by mass or more, and still more preferably 95% by mass or more.

The acrylic-based polymer may be a copolymer of the acrylic-based monomer and a vinyl-based monomer copolymerizable with the acrylic-based monomer. That is, the acrylic-based polymer may be a copolymer of a feedstock monomer comprising the acrylic-based monomer and a vinyl-based monomer copolymerizable with the acrylic-based monomer. Examples of such a vinyl-based monomer include styrene-based monomers such as styrene, α-methylstyrene, vinyltoluene, chlorostyrene, ethylstyrene, i-propylstyrene, dimethylstyrene, and bromostyrene, and monomers having a vinyl group such as vinyl acetate and acrylonitrile.

As the acrylic-based polymer, a polymer of an acrylic-based monomer and a copolymer of an acrylic-based monomer and a styrene-based monomer are preferable, and a polymer of an acrylic-based monomer is more preferable.

As the acrylic-based polymer, polymers of alkyl methacrylates are preferable, and a polymer of methyl methacrylate, a polymer of ethyl methacrylate, and a copolymer of methyl methacrylate and ethyl methacrylate are preferable. By using polymer particles containing such an acrylic-based polymer for a dental composition described later, the mechanical strength of a cured product of the dental composition can be improved.

When the polymer particles contain an acrylic-based polymer, the content of the acrylic-based polymer in the polymer particles is preferably 70% by mass or more, more preferably 85% by mass or more, still more preferably 90% by mass or more, and even more preferably 95% by mass or more. By adjusting the content of the acrylic-based polymer to 70% by mass or more, polymer particles superior in thickening effect, solvent resistance, water resistance, chemical resistance, and/or the like are obtained.

The styrene-based polymer is a polymer of a feedstock monomer containing a styrene-based monomer in an amount of preferably more than 50% by mass. The styrene-based monomer is not particularly limited, and examples thereof include styrene, α-methylstyrene, vinyltoluene, chlorostyrene, ethylstyrene, i-propylstyrene, dimethylstyrene, bromostyrene, and the like. Among them, styrene is preferable. The styrene-based monomer may be used alone or in combination of two or more kinds thereof.

The styrene-based polymer may be a copolymer of the styrene-based monomer and a vinyl-based monomer copolymerizable with the styrene-based monomer. That is, it may be a copolymer of a feedstock monomer comprising the styrene-based monomer and a vinyl-based monomer copolymerizable with the styrene-based monomer. Examples of such a vinyl-based monomer include acrylic-based monomers, (meth)acrylonitrile, and bifunctional monomers such as dimethyl maleate, dimethyl fumarate, diethyl fumarate, ethyl fumarate, divinylbenzene, alkylene glycol dimethacrylate, and polyethylene glycol di(meth)acrylate. (Meth)acrylonitrile means acrylonitrile or methacrylonitrile.

The content of the styrene-based monomer component in the styrene-based polymer is preferably more than 50% by mass, more preferably 80% by mass or more, and still more preferably 95% by mass or more.

When the polymer particles contain a styrene-based polymer, the content of the styrene-based polymer in the polymer particles is preferably 70% by mass or more, more preferably 85% by mass or more, still more preferably 90% by mass or more, and even more preferably 95% by mass or more. By adjusting the content of the styrene-based polymer to 70% by mass or more, polymer particles superior in thickening effect, solvent resistance, water resistance, chemical resistance, and/or the like are obtained.

The polymer contained in the polymer particles may be crosslinked by a polyfunctional monomer. Therefore, the feedstock monomer may comprise a polyfunctional monomer. However, the polymer contained in the polymer particles is preferably slightly crosslinked by a polyfunctional monomer, and more preferably not crosslinked by a polyfunctional monomer because the solubility of the polymer particles in a dissolving medium is increased.

The polyfunctional monomer is a monomer having a plurality of polymerizable functional groups (for example, vinyl group, epoxy group, isocyanate group, and the like). The polyfunctional monomer preferably has a plurality of vinyl groups as functional groups. Examples of the polyfunctional monomer include acrylic-based polyfunctional monomers such as 1,10-decanediol dimethacrylate, polyethylene glycol dimethacrylate, trimethylolpropane tri(meth)acrylate, ethylene glycol di(meth)acrylate, diethylene glycol di(meth)acrylate, triethylene glycol di(meth)acrylate, decaethylene glycol di(meth)acrylate, pentadecaethylene glycol di(meth)acrylate, pentacontahecta ethylene glycol di(meth)acrylate, pentaerythritol tetra(meth)acrylate, 1,3- butylene di(meth)acrylate, and allyl (meth)acrylate, aromatic divinyl compounds such as divinylbenzene, divinylnaphthalene, and derivatives thereof, and the like. In the present invention, (meth)acrylate means acrylate or methacrylate. The polyfunctional monomer may be used alone or in combination of two or more kinds thereof.

The content of the polyfunctional monomer in the feedstock monomers is preferably 1.0% by mass or less, more preferably 0.6% by mass or less, and particularly preferably 0% by mass based on the total amount of the feedstock monomer. When the content of the polyfunctional monomer is 1.0% by mass or less, it is possible to improve the solubility of the polymer particles in the dissolving medium, thereby making it possible to uniformly dissolve the polymer particles in the dissolving medium without generating an unmixed lump.

[Method for Producing Polymer Particles]

The method for producing polymer particles of the present invention is not particularly limited as long as polymer particles that satisfy the number average particle diameter, the coefficient of variation in number-based particle size distribution, and the formulas (1) and (2) can thereby be produced, and polymer particles can be produced by polymerizing a feedstock monomer in a common manner in the presence of a polymerization initiator, as necessary. The polymerization method is not particularly limited, and general polymerization methods such as suspension polymerization, seed polymerization, bulk polymerization, and solution polymerization can be used. Among them, suspension polymerization is preferable because a prescribed difference is easily provided in the molecular weight of polymer particles to be obtained. Emulsion polymerization is a polymerization method in which a feedstock monomer is dispersed in an aqueous medium described later and polymerized in the presence of a polymerization initiator and an emulsifier, and is included in suspension polymerization.

The polymerization initiator is not particularly limited as long as it can initiate the polymerization of the feedstock monomer. Examples of the polymerization initiator include organic peroxides such as benzoyl peroxide, lauroyl peroxide, and t-butylperoxy 2-ethylhexanoate, azo-based nitrile compounds such as 2,2'-azobisisobutyronitrile, 2,2'-azobis(2-methylbutyronitrile), and 2,2'-azobis(2,4-dimethylvaleronitrile), and the like. The 10-hour half-life temperature of the polymerization initiator is preferably 40 to 80° C. The polymerization initiator may be used alone or in combination of two or more kinds thereof.

The polymerization initiator is used preferably in an amount of 0.01 to 10 parts by mass, more preferably 0.01 to 7 parts by mass, and particularly preferably 0.01 to 5 parts by mass based on 100 parts by mass of the feedstock monomer because the polymerization of the feedstock monomer can be smoothly initiated.

The method for producing polymer particles of the present invention preferably comprises a polymerization step of subjecting a feedstock monomer to suspension polymerization in an aqueous medium in the presence of a polymerization initiator to produce polymer particles. The suspension polymerization is preferably performed by dispersing droplets of a raw material mixture (oil phase) comprising a feedstock monomer and a polymerization initiator in an aqueous medium (aqueous phase) to obtain a dispersion liquid, and polymerizing the feedstock monomer in the dispersion liquid. The feedstock monomer preferably comprises a monomer containing a vinyl group, more preferably comprises an acrylic-based monomer and/or a styrene-based monomer, and still more preferably comprises an acrylic-based monomer. The feedstock monomers may be used alone or in combination of two or more kinds thereof.

In order to adjust the weight average molecular weight of the resulting polymer particles, the raw material mixture may comprise a molecular weight regulator. Examples of the molecular weight regulator include mercaptans such as n-octylmercaptan and tert-dodecylmercaptan; α-methylstyrene, α-methylstyrene dimer; terpenes such as γ-terpinene and dipentene; halogenated hydrocarbons such as chloroform and carbon tetrachloride; and the like. The weight average molecular weight of the polymer particles can be adjusted by adjusting the content of the molecular weight regulator. The molecular weight regulator may be used alone or in combination of two or more kinds thereof. The molecular weight regulator is used preferably in an amount of 0.01 to 1 part by mass, and more preferably 0.05 to 1 part by mass based on 100 parts by mass of the feedstock monomer.

The aqueous medium is not particularly limited, and examples thereof include water, water-soluble organic media (lower alcohols (alcohols having 5 or less carbon atoms) such as methanol and ethanol), a mixed medium of water and a water-soluble organic medium, and the like; and the aqueous medium preferably comprises water. The aqueous medium is used preferably in an amount of 100 to 1,000 parts by mass based on 100 parts by mass of the feedstock monomer in order to stabilize the polymerization.

The aqueous medium may contain a dispersion stabilizer. Examples of the dispersion stabilizer include phosphate salts such as calcium phosphate, magnesium phosphate, aluminum phosphate, and zinc phosphate; pyrophosphate salts such as calcium pyrophosphate, magnesium pyrophosphate, aluminum pyrophosphate, and zinc pyrophosphate; poorly water-soluble inorganic compounds such as calcium carbonate, magnesium carbonate, calcium hydroxide, magnesium hydroxide, aluminum hydroxide, calcium metasilicate, calcium sulfate, barium sulfate, and colloidal silica; water-soluble polymers such as polyvinyl pyrrolidone and polyvinyl alcohol; and the like. Among them, it is preferable to use one that is decomposed by an acid to dissolve in water (for example, calcium carbonate, tribasic calcium phosphate, magnesium hydroxide, magnesium pyrophosphate, and calcium pyrophosphate) because the dispersion stabilizer can be easily removed after the polymerization step. The dispersion stabilizer may be used alone or in combination of two or more kinds thereof.

The dispersion stabilizer is used preferably in an amount of 0.1 to 20 parts by mass, and more preferably 0.5 to 10 parts by mass based on 100 parts by mass of the feedstock monomer because the dispersion stabilizer is superior in the dispersibility of polymer particles in a suspension containing the polymer particles while ensuring the fluidity of the suspension.

Since polymer particles obtained by suspension-polymerizing droplets of a raw material mixture (oil phase) comprising a feedstock monomer and a polymerization initiator generate aggregation, it is preferable to make the aqueous medium contain a water-soluble polymerization stabilizer. The polymerization stabilizer is not particularly limited, and examples thereof include nitrites such as sodium nitrite, sulfites, hydroquinones, ascorbic acids, water-soluble vitamin Bs, citric acid, polyphenols, and the like; nitrites are preferable, and sodium nitrite is more preferable. The polymerization stabilizer may be used alone or in combination of two or more kinds thereof.

The polymerization stabilizer is used preferably in an amount of 0.005 to 0.1 parts by mass, and more preferably 0.005 to 0.05 parts by mass based on 100 parts by mass of the aqueous medium because aggregation of polymer particles can be more effectively suppressed.

In order to further stabilize the suspension (reaction liquid) during suspension polymerization, a surfactant may be contained in the aqueous medium. As the surfactant, any of an anionic surfactant, a cationic surfactant, a nonionic surfactant, and a zwitterionic surfactant can be used. The surfactant may be used alone or in combination of two or more kinds thereof.

Examples of the anionic surfactant include sodium oleate; fatty acid oils such as potassium castorate; alkyl sulfuric acid ester salts such as sodium lauryl sulfate and ammonium lauryl sulfate; alkyl benzene sulfonic acid salts such as sodium dodecylbenzenesulfonate; alkyl naphthalene sulfonic acid salts; alkane sulfonic acid salts; dialkyl sulfosuccinic acid salts such as sodium dioctyl sulfosuccinate; alkenyl succinic acid salts (dipotassium salts); alkyl phosphoric acid ester salts; naphthalene sulfonic acid formalin condensates; polyoxyethylene alkyl ether sulfuric acid salts such as polyoxyethylene alkyl phenyl ether sulfuric acid ester salts and sodium polyoxyethylene lauryl ether sulfate; polyoxyethylene alkyl sulfuric acid ester salts; and the like.

Examples of the cationic surfactant include alkylamine salts such as laurylamine acetate and stearylamine acetate; quaternary ammonium salts such as lauryltrimethylammonium chloride; and the like.

Examples of the nonionic surfactant include polyoxyethylene alkyl ethers, polyoxyethylene alkylphenyl ethers, polyoxyethylene fatty acid esters, sorbitan fatty acid esters, polyoxysorbitan fatty acid esters, polyoxyethylene alkylamines, glycerin fatty acid esters, oxyethylene-oxypropylene block polymers, and the like.

Examples of the zwitterionic surfactant include lauryldimethylamine oxide, phosphoric acid ester-based surfactants, phosphorous acid ester-based surfactants, and the like.

In the polymerization step, it is preferable to perform the polymerization of the feedstock monomer in a dispersion liquid in which droplets of the raw material mixture (oil phase) comprising the feedstock monomer and the polymerization initiator are dispersed. In the polymerization step, the dispersion liquid is heated using a general-purpose heating apparatus, and the polymerization of the feedstock monomer is performed while the dispersion liquid is maintained at a preset polymerization standard temperature as much as possible. In the polymerization step, the temperature of the dispersion liquid may have a temperature range, but it is preferably adjusted to a substantially constant temperature as much as possible.

In the polymerization step, the polymerization standard temperature of the dispersion liquid is not particularly limited, but is preferably 50 to 110° C., and more preferably 60 to 100° C. When the polymerization standard temperature of the dispersion liquid is 50° C. or higher, the polymerization proceeds at an appropriate rate, and polymer particles having a prescribed molecular weight can be obtained. When such polymer particles are dispersed in a dissolving medium to prepare a composition, a rapid increase in the viscosity of the composition can be suppressed, and thickening of the composition can be stably performed without allowing the viscosity of the composition to be uneven. When the polymerization standard temperature of the dispersion liquid is 110° C. or lower, decomposition of the polymer of the feedstock monomer by depolymerization is suppressed, and polymer particles having a prescribed difference in molecular weight can be obtained. As a result, the polymer particles can be dissolved in a dissolving medium without generating an unmixed lump when being charged into the dissolving medium, and can uniformly increase the viscosity of the composition.

In the polymerization step, in order to maintain the temperature of the dispersion liquid at the polymerization standard temperature as much as possible, heating of the dispersion liquid by a heating apparatus and stopping thereof are repeated. However, it is difficult to maintain the temperature of the dispersion liquid at the polymerization standard temperature during the entire polymerization step, and the temperature of the dispersion liquid repeatedly fluctuates up and down around the polymerization standard temperature while drawing a waveform like a sin curve.

As described above, the temperature of the dispersion liquid in the polymerization step (the polymerization temperature) fluctuates up and down around the polymerization standard temperature. The polymerization temperature is preferably controlled to (polymerization standard temperature−0.5° C.)≤polymerization temperature≤(polymerization standard temperature+0.5° C.), and more preferably controlled to (polymerization standard temperature−0.3° C.)≤polymerization temperature≤(polymerization standard temperature+0.3° C.), except for the heat generation step described later. As described above, by controlling the polymerization temperature, it is possible to stably advance the polymerization of the feedstock monomer while suppressing the difference in molecular weight among the polymer particles from becoming excessively large.

The polymerization standard temperature is a temperature at which the feedstock monomer in the dispersion liquid is polymerized, and is set in advance. However, as described above, since the polymerization temperature usually fluctuates up and down with a similar fluctuation range, in a state where the polymerization conversion rate of the feedstock monomer is 10% or more and less than 50% is stable, the arithmetic mean value of the minimum temperature and the maximum temperature of the dispersion liquid can be regarded as the polymerization standard temperature.

On the other hand, in the latter half of the polymerization of the feedstock monomer, that is, when the polymerization conversion rate is 50% or more, internal heat generation due to an increase in the polymerization rate of the feedstock monomer and an increase in the viscosity of the dispersion liquid rapidly occurs (heat generation step). In the present invention, the polymerization conversion rate refers to a value calculated based on the following formula.

Polymerization conversion rate (%)=100×(the amount of feedstock monomer consumed by polymerization)/(the total amount of feedstock monomer)

In the conventional temperature control, since in the polymerization step, the same temperature control is performed both in the heat generation step and before the heat generation step, the heat generation in the heat generation step cannot be sufficiently controlled, leading to a rapid temperature rise of the dispersion liquid, and the unreacted feedstock monomer rapidly reacts in a short time to rapidly increase the viscosity of the dispersion liquid. As a result, heating of the dispersion liquid by the heating apparatus becomes uneven due to the increase in the viscosity of the dispersion liquid, so that the difference in molecular weight among the polymer particles becomes excessively large. As a result, a large difference also occurs in solubility and in a thickening effect for each polymer particle, and as a result, there arises a problem that an unmixed lump is generated when the polymer particles are put into a dissolving medium or the entire composition thickened by the polymer particles becomes uneven in viscosity.

Therefore, in the present invention, in the heat generation step that occurs near the polymerization end point of the feedstock monomer, the control is performed by cooling the dispersion liquid such that the polymerization temperature is preferably (polymerization standard temperature+2.0° C.) or lower, more preferably (polymerization standard temperature+1.5° C.) or lower, and still more preferably (polymerization standard temperature+1.0° C.) or lower. Small particles exhibit a higher cooling effect than large particles because the smaller particles have a larger total surface area than the large particles. Therefore, the effect of suppressing the polymerization reaction by the cooling is greater with the small particles than with the large particles, the molecular weight of the polymer contained in the small particles can be made smaller than the molecular weight of the polymer contained in the large particles, and an appropriate difference can be formed in the molecular weight of the polymer. That is, by controlling the polymerization temperature to (polymerization standard temperature+2.0° C.) or lower, it is possible to suppress the occurrence of an excessive difference in cooling effect due to the difference in particle diameter, and to provide an appropriate difference in the molecular weight of each polymer particle.

In addition, in the heat generation step, it is preferable to control the cooling of the dispersion liquid such that the polymerization temperature is (polymerization standard temperature+0.5° C.) or higher. By adjusting the polymerization temperature to (polymerization standard temperature+0.5° C.) or higher, it is possible to generate an appropriate difference in the polymerization rate in particles depending on the difference in particle diameter to provide an appropriate difference in the molecular weight of each polymer particle.

Since the heat generation step occurs in the latter half of the polymerization, when the temperature has exceeded the maximum temperature of the dispersion liquid in a polymerization conversion rate range of 10% or more and less than 50% wherein the polymerization reaction is stably performed, it can be determined that the heat generation step has occurred and the temperature control in the heat generation step may be started.

Then, after the heat generation in the heat generation step is completed, it is preferable to sufficiently perform the polymerization reaction of the feedstock monomer by performing the same temperature control as that before the heat generation step, and polymer particles having a prescribed difference in molecular weight can thereby be obtained.

The determination that the heat generation in the heat generation step has ended can be made in the same manner as the determination of the start of the heat generation step as described above. Specifically, when the temperature becomes below the maximum temperature of the dispersion liquid in a polymerization conversion rate range of 10% or more and less than 50% wherein the polymerization reaction is stably performed, the heat generation step may be determined to have ended.

The duration of the polymerization step after the start of the heat generation step is preferably 60 minutes or more, more preferably 120 minutes or more, and still more preferably 180 minutes or more. The duration of the polymerization step after the heat generation step is preferably 360 minutes or less, more preferably 300 minutes or less, and still more preferably 240 minutes or less. When the duration of the polymerization step after the heat generation step is 60 minutes or more, the polymerization heat generation is removed by substantially ending the polymerization reaction of the feedstock monomer, and polymer particles having a prescribed difference in molecular weight can be obtained.

The method for producing polymer particles of the present invention preferably comprises a step of classifying the obtained polymer particles after the polymerization step. In this classification step, fine particles having a small particle diameter and coarse particles having a large particle diameter are removed from the polymer particles after the polymerization step, whereby the number average particle diameter and the coefficient of variation of the polymer particles can be adjusted to fall within prescribed ranges.

The degree of removing the coarse particles by classification is not particularly limited, but it is preferable to remove at least part of the coarse particles by classification from the polymer particles before classification until the content of the large particles having a particle diameter of 5 times or more the number average particle diameter in the polymer particles after classification becomes 0.1% or less, preferably 0.08% or less, and more preferably 0.05% or less on a number basis.

The degree of removing the fine particles by classification is not particularly limited, but it is preferable to remove at least part of the fine particles by the classification from the polymer particles before the classification until the particle diameter (D5) corresponding to a cumulative number percentage of 5% counted from the small diameter side in the number-based particle size distribution in the polymer particles after the classification is 1.03 times or more, preferably 1.03 to 1.5 times, and still more preferably 1.05 to 1.5 times the particle diameter (D5') corresponding to a cumulative number percentage of 5% counted from the small diameter side in the number-based particle size distribution in the polymer particles before the classification.

The method for classifying polymer particles is not particularly limited as long as fine particles and coarse particles can be removed by classification, and examples thereof include air flow classification (air classification), screen classification (sieve classification), and the like. Among them, air flow classification is preferable because classification can be performed with high accuracy without causing clogging by fine particles and coarse particles. The air flow classification refers to a method of classifying particles using a flow of air. The screen classification refers to a method of classifying particles on a screen into particles passing through a mesh of the screen and particles not passing through the mesh of the screen by feeding the particles onto the screen and vibrating the screen.

Examples of the air flow classification include (1) a method in which polymer particles are placed in a flow of air, the polymer particles are brought into collision with a screen, and the polymer particles are classified into polymer particles that pass through a mesh of the screen and polymer particles that do not pass through the mesh, (2) a method in which polymer particles are placed in a whirling flow of air, and the polymer particles are classified into two groups, namely, a large particle diameter group and a small particle diameter group, by an interaction between a centrifugal force applied to the polymer particles by the whirling airflow and an airflow toward a whirling center of the airflow, and (3) a classification method utilizing the Coanda effect.

Examples of the air flow classifier for performing the air flow classification (1) include air flow classifiers commercially available under the trade name "BLOWER SIFTER" manufactured by Yougrop Co., Ltd., under the trade name "Hi-BOLTER" manufactured by Toyo Hitec Co., Ltd., and under the trade name "MICRO Sifter" manufactured by Makino MFG. Co., Ltd. Examples of the air flow classifier for performing the air flow classification (2) include air flow classifiers commercially available under the trade name "Turbo Classifier (registered trademark)" from Nisshin Engineering Inc., and under the trade name "Spedic Classifier" from Seishin Enterprise Co., Ltd. Examples of the air flow classifier for performing the air flow classification (3) include a Coanda type air current classifier (Elbow-Jet classifier) commercially available from MATSUBO Corporation. The above three classification methods may be selected and used depending on the properties of the polymer particles to be classified and the degree of removing coarse particles and fine particles. In order to accurately remove coarse particles, it is preferable to use the air flow classifier (1). In addition, in order to accurately remove fine particles, it is preferable to use the air flow classifier (2).

The polymer particles of the present invention not only have a superior thickening effect, but also can be uniformly dissolved in a dissolving medium without generating an unmixed lump, and can uniformly increase the viscosity of the composition. Furthermore, according to the polymer particles of the present invention, it is also possible to, after uniformly increasing the viscosity of a composition, stably maintain a uniform state of the increased viscosity. Accordingly, since the polymer particles of the present invention have a superior thickening effect, they are suitably used as a thickener for cosmetics, pharmaceuticals, adhesives, paints, and the like.

[Composition]

The composition of the present invention is obtained by dissolving the above-described polymer particles in a dissolving medium. By dissolving the polymer particles in the dissolving medium, the viscosity of the resulting composition can be increased. This composition comprises a polymer formed by dissolving polymer particles in a dissolving medium. That is, this composition comprises a dissolving medium and a solution of polymer particles.

The dissolving medium is not particularly limited as long as it can dissolve at least the polymer particles among the components contained in the composition. Examples of the dissolving medium include a solvent and a monomer polymerizable by irradiation with ionizing radiation. The dissolving medium may be used alone or in combination of two or more kinds thereof.

The solvent is not particularly limited, and examples thereof include water, an organic solvent, and the like. The organic solvent is not particularly limited, and examples thereof include monohydric alcohols such as methanol, ethanol, propanol, isopropanol, n-butanol, tert-butanol, and 2-ethylhexyl alcohol; polyhydric alcohols such as ethylene glycol, propylene glycol, and butylene glycol; monoethers of polyhydric alcohols such as ethylene glycol monoethyl ether and ethylene glycol monobutyl ether; cyclic ethers such as tetrahydrofuran; ketones such as acetone, methyl ethyl ketone, methyl isobutyl ketone, cyclopentanone, and cyclohexanone; aliphatic or aromatic hydrocarbons such as benzene, toluene, xylene, ethylbenzene, hexane, heptane, octane, isododecane, cyclopentane, cyclohexane, and liquid paraffin; halogenated hydrocarbons such as carbon tetrachloride and chlorobenzene; animal and vegetable oils such as sunflower oil, olive oil, soybean oil, corn oil, castor oil, beef tallow, jojoba oil, and squalane; silicones such as dimethylpolysiloxane and methylphenylpolysiloxane; esters such as butyl acetate, octyldodecyl oleate, cetyl octanoate, cetyl ethylhexanoate, glyceryl triisooctanate, neopentyl glycol diisooctanate, and tricaprylin; and the like. The solvent may be used alone or in combination of two or more kinds thereof.

As to the monomer polymerizable by irradiation with ionizing radiation, examples of the ionizing radiation include X-rays, γ-rays, ultraviolet rays, visible rays, electron beams, and the like. Examples of the monomer polymerizable by irradiation with ionizing radiation include acrylic-based monofunctional monomers, acrylic-based polyfunctional monomers, styrene-based monofunctional monomers, and the like. Among them, acrylic-based monofunctional monomers and acrylic-based polyfunctional monomers are preferable, and acrylic-based monofunctional monomers are more preferable. The acrylic-based monofunctional monomers are not particularly limited, and examples thereof include acrylic acid, methacrylic acid, (meth)acrylates, and the like. The monomer polymerizable by irradiation with ionizing radiation may be used alone or in combination of two or more kinds thereof.

Examples of the (meth)acrylates of the monomer polymerizable by irradiation with ionizing radiation include alkyl (meth)acrylates such as methyl (meth)acrylate, ethyl (meth)acrylate, propyl (meth)acrylate, n-butyl (meth)acrylate, isobutyl (meth)acrylate, and lauryl (meth)acrylate; benzyl (meth)acrylate, 2-(N,N-dimethylamino)ethyl (meth)acrylate, 2,3-dibromopropyl (meth)acrylate, 2-hydroxyethyl (meth)acrylate, 6-hydroxyhexyl (meth)acrylate, 10-hydroxydecyl (meth)acrylate, propylene glycol mono(meth)acrylate, glycerin mono(meth)acrylate, erythritol mono (meth)acrylate, N-methylol (meth)acrylamide, N-hydroxyethyl (meth)acrylamide, N-(dihydroxyethyl) (meth)acrylamide, (meth)acryloyloxydodecylpyridinium bromide, (meth)acryloyloxydodecylpyridinium chloride, (meth)acryloyloxyhexadecylpyridinium chloride, (meth)acryloyloxydecylammonium chloride, and the like. Among them, alkyl (meth)acrylates are preferable, alkyl methacrylates are more preferable, and methyl methacrylate, ethyl methacrylate, n-butyl methacrylate, and isobutyl methacrylate are still more preferable. (Meth)acrylamide means acrylamide or methacrylamide.

Examples of the acrylic-based polyfunctional monomers of the monomer to be polymerized by irradiation with ionizing radiation include aliphatic acrylic-based polyfunctional monomers such as ethylene glycol di(meth)acrylate, diethylene glycol di(meth)acrylate, triethylene glycol di(meth)acrylate, butylene glycol di(meth)acrylate, nonaethylene glycol di(meth)acrylate, propylene glycol di(meth)acrylate, dipropylene glycol di(meth)acrylate, neopentyl glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, trimethylolpropane tri (meth)acrylate, neopentyl glycol di(meth)acrylate, pentaerythritol tri(meth)acrylate, trimethylolmethane tri(meth)acrylate, and pentaerythritol tetra(meth)acrylate; aromatic acrylic-based polyfunctional monomers such as 2,2-bis ((meth)acryloyloxyphenyl)propane, 2,2-bis[4-(2-hydroxy-3-(meth)acryloyloxyphenyl)]propane, 2,2-bis(4-(meth)acryloyloxyethoxyphenyl)propane, 2,2-bis(4-(meth) acryloyloxydiethoxyphenyl)propane, and 2,2-bis(4-(meth) acryloyloxypropoxyphenyl)propane; acrylic-based polyfunctional monomers containing an acidic group such as 11-(meth)acryloyloxy-1,1-undecane dicarboxylic acid, 4-(meth)acryloyloxyethyl trimellitic acid and anhydride thereof, 2-methacryloyloxyethyl dihydrogen phosphate, bis (2-methacryloyloxyethyl) hydrogen phosphate, and 10-methacryloyloxydecyl dihydrogen phosphate; acrylic-based polyfunctional monomers containing a basic group such as N,N-dimethylaminoethyl methacrylate; and the like. (Meth)acryloyloxy means acryloyloxy or methacryloyloxy.

The composition of the present invention is obtained by dissolving polymer particles in a dissolving medium. The difference between the solubility parameter of the dissolving medium and the solubility parameter of the polymer contained in the polymer particles is preferably small. As a result, the polymer particles easily conform to the dissolving medium, and it becomes easy to uniformly dissolve the polymer particles in the dissolving medium without generating an unmixed lump. Furthermore, the polymer particles make it possible to uniformly increase the viscosity of the composition and then more stably maintain a uniform state of the increased viscosity.

When the polymer particles contain an acrylic-based polymer and/or a styrene-based polymer, examples of the dissolving medium contained in the composition preferably include toluene, n-heptane, methyl methacrylate, butyl acetate, ethyl acetate, methyl ethyl ketone, acetone, and cyclohexane, and more preferably include toluene, cyclohexane, and methyl methacrylate. The solubility parameters of these dissolving media each have a small difference with respect to the solubility parameter of the acrylic-based polymer and/or the styrene-based polymer.

The blending amount of the polymer particles in the composition is preferably 0.1 to 100 parts by mass, and more preferably 1 to 50 parts by mass based on 100 parts by mass of the dissolving medium. The content of the solution of the polymer particles in the composition is preferably 0.1 to 100 parts by mass, and more preferably 1 to 50 parts by mass based on 100 parts by mass of the dissolving medium.

The composition preferably comprises a synthetic resin, or an oligomer polymerizable by irradiation with ionizing radiation. When the composition comprises a synthetic resin, the composition can be formed into a desired shape such as a coating film. The synthetic resin may be any of an ionizing radiation curable resin, a thermoplastic resin, and a thermosetting resin. The synthetic resin may be used alone or in combination of two or more kinds thereof. Examples of the thermoplastic resin include acrylic-based resins, polycarbonates, polyester-based resins, polyolefin-based resins such as polyethylene-based resins and polypropylene-based resins, polystyrene-based resins, and the like. Among them, acrylic-based resins, polycarbonates, polyester-based resins, and polystyrene-based resins are preferable because they are superior in transparency. The thermoplastic resin may be used alone or in combination of two or more kinds thereof.

Examples of the thermosetting resin include thermosetting-type urethane resins constituted by acrylic polyol and isocyanate prepolymer, phenolic resins, urea melamine resins, epoxy resins, unsaturated polyester resins, silicone resins, and the like.

The ionizing radiation curable resin means a resin that is cured by irradiation with ionizing radiation. Examples of the ionizing radiation include X-rays, γ-rays, ultraviolet rays, visible rays, electron beams, and the like. Examples of the ionizing radiation curable resin include polyfunctional (meth)acrylate resins; polyfunctional urethane acrylate resins as synthesized from such as a diisocyanate, a polyhydric alcohol, a (meth)acrylic acid ester having a hydroxy group; and the like. As the ionizing radiation curable resin, polyfunctional (meth)acrylate resins are preferable, and a polyfunctional (meth)acrylate resin synthesized from a polyhydric alcohol polyfunctional (meth)acrylate having three or more (meth)acryloyl groups in one molecule is more preferable. Specific examples of the polyhydric alcohol polyfunctional (meth)acrylate having three or more (meth)acryloyl groups in one molecule include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, dipentaerythritol triacrylate, dipentaerythritol pentaacrylate, dipentaerythritol tetra(meth)acrylate, dipentaerythritol hexa(meth)acrylate, tripentaerythritol triacrylate, tripentaerythritol hexaacrylate, and the like. The ionizing radiation curable resin may be used alone or in combination of two or more kinds thereof. (Meth) acrylic acid means acrylic acid or methacrylic acid. (Meth) acryloyl means acryloyl or methacryloyl.

Other examples of the ionizing radiation curable resin include a polyether resin having an acrylate-based functional group, a polyester resin having an acrylate-based functional group, an epoxy resin having an acrylate-based functional group, an alkyd resin having an acrylate-based functional group, a spiroacetal resin having an acrylate-based functional group, a polybutadiene resin having an acrylate-based functional group, a polythiol polyene resin having an acrylate-based functional group, and the like.

When the ionizing radiation curable resin is cured by irradiation with ultraviolet rays, the composition preferably comprises a photopolymerization initiator. By using the photopolymerization initiator, the ionizing radiation curable resin can be cured by ultraviolet irradiation. When the composition comprises a monomer polymerizable by irradiation with ionizing radiation or an oligomer polymerizable by irradiation with an ionizing radiation, the composition preferably comprises a photopolymerization initiator. By using the photopolymerization initiator, a monomer polymerizable by irradiation with ionizing radiation or an oligomer polymerized by irradiation with ionizing radiation can be polymerized by ultraviolet irradiation to cure the composition.

The photopolymerization initiator is not particularly limited. Examples of the photopolymerization initiator include acetophenones, benzoins, benzophenones, phosphine oxides, ketals, α-hydroxyalkylphenones, α-aminoalkylphenones, anthraquinones, thioxanthones, azo compounds, peroxides (disclosed in Japanese Unexamined Patent Application, First Publication No. 2001-139663, etc.), 2,3-dialkyldione compounds, disulfide compounds, fluoroamine compounds, aromatic sulfoniums, onium salts, borate salts, active halogen compounds, α-acyloxime esters, and the like.

Examples of the acetophenones include acetophenone, 2,2-diethoxyacetophenone, p-dimethylacetophenone, 1-hydroxydimethylphenyl ketone, 1-hydroxycyclohexylphenyl ketone, 2-methyl-4-methylthio-2-morpholinopropiophenone, 2-benzyl-2-dimethylamino-1-(4-morpholinophenyl)-butanone, and the like. Examples of the benzoins include benzoin, benzoin benzoate, benzoin benzene sulfonate ester, benzoin toluensulfonate ester, benzoin methyl ether, benzoin ethyl ether, benzoin isopropyl ether, and the like. Examples of the benzophenones include benzophenone, 2,4-dichlorobenzophenone, 4,4-dichlorobenzophenone, p-chlorobenzophenone, and the like. Examples of the phosphine oxides include 2,4,6-trimethylbenzoyldiphenylphosphine oxide and the like. Examples of the ketals include benzyl methyl ketals such as 2,2-dimethoxy-1,2-diphenylethan-1-one, and the like. Examples of the α-hydroxyalkylphenones include 1-hydroxycyclohexylphenyl ketone and the like. Examples of the α-aminoalkylphenones include 2-methyl-1-[4-(methylthio)phenyl]-2-(4-morpholinyl)-1-propanone and the like.

Preferable examples of commercially available photopolymerization initiators include "IRGACURE (registered trademark) 651" (2,2-dimethoxy-1,2-diphenylethan-1-one)

manufactured by BASF Japan Ltd., "IRGACURE (registered trademark) 184" manufactured by BASF Japan Ltd., "IRGACURE (registered trademark) 907" (2-methyl-1-(4-methylthiophenyl)-2-morpholinopropan-1-one) manufactured by BASF Japan Ltd., and the like.

The photopolymerization initiator is used preferably in an amount of 0.5 to 20 parts by mass, more preferably 1 to 10 parts by mass, and particularly preferably 1 to 8 parts by mass, based on 100 parts by mass of the total amount of monomers and oligomers of the ionizing radiation curable resin.

The composition of the present invention may comprise a pigment. Examples of the pigment include inorganic pigments such as titanium oxide, calcium carbonate, aluminum, copper, mica, iron oxide, and carbon black, and organic pigments such as phthalocyanine blue, phthalocyanine green, dioxazine violet, toluidine red, perylene, quinacridone, and benzidine yellow. The pigment may be used alone or in combination of two or more kinds thereof.

The composition of the present invention may comprise a filler. Examples of the filler include inorganic fillers. Examples of the inorganic filler include metal oxides such as amorphous silica, quartz, alumina, titania, zirconia, barium oxide, yttrium oxide, lanthanum oxide, and ytterbium oxide; silica-based composite oxides such as silica-zirconia, silica-titania, silica-titania-barium oxide, and silica-titania-zirconia; glasses such as borosilicate glass, aluminosilicate glass, and fluoroaluminosilicate glass; metal fluorides such as barium fluoride, strontium fluoride, yttrium fluoride, lanthanum fluoride, and ytterbium fluoride; inorganic carbonates such as calcium carbonate, magnesium carbonate, strontium carbonate, and barium carbonate; metal sulfates such as magnesium sulfate and barium sulfate; and the like. The filler may be used alone or in combination of two or more kinds thereof.

The inorganic filler may be surface-treated with a silane coupling agent. Examples of the silane coupling agent include γ-methacryloxypropyltrimethoxysilane, vinyltrimethoxysilane, and the like.

The composition of the present invention may comprise other additives such as a viscosity modifier, an antifoaming agent, a light stabilizer, a weather stabilizer, a heat stabilizer, an ultraviolet absorber, an antioxidant, a leveling agent, a pigment dispersant, a pH adjuster, a polymerization inhibitor, an antibacterial agent, an X-ray contrast agent, and a fluorescent agent. These other additives may be used alone or in combination of two or more kinds thereof.

The composition of the present invention is preferably used as a coating composition. In the present invention, by using the above-described polymer particles as a thickener, the viscosity of the composition can be easily adjusted to a desired range, and a composition having a uniform composition and viscosity can be obtained. Therefore, the composition of the present invention is superior in applicability and can form a coating film having a uniform thickness.

Furthermore, the polymer particles of the present invention can be uniformly dissolved in a dissolving medium without generating an unmixed lump, and can uniformly increase the viscosity of the composition. When the viscosity of the composition is uneven, a whitened portion is generated in a resulting coating film when such a composition is applied, which leads to poor appearance. However, the polymer particles of the present invention can reduce the occurrence of such appearance defects.

Therefore, using the composition of the present invention, it is possible to form a coating film being uniform in thickness and composition with reduced occurrence of poor appearance.

The coated body of the present invention has a base material and a coating film integrally laminated on one surface of the base material. As this coating film, a coating film of the composition described above can be used. Examples of the material of the base material include cement, tile, metal, synthetic resin, glass, and the like. The synthetic resin to be used as the base material is not particularly limited, and examples thereof include polyester resins such as polyethylene terephthalate, triacetyl cellulose resins, polystyrene resins, acrylic resins, polycarbonate resins, cycloolefin-based resins, and the like.

The coating film can be formed by applying the composition to an arbitrary coating surface of a base material or the like to prepare an applied film, drying the applied film, and then curing the applied film, as necessary. As a method for applying the composition to the coating surface, a known method such as a reverse roll coating method, a gravure coating method, a die coating method, a comma coating method or a spray coating method can be used.

It is preferable to use the composition of the present invention as a dental composition. When the composition of the present invention is used as a dental composition, it is preferable that the dental composition comprises a dissolving medium containing a monomer polymerizable by irradiation with ionizing radiation and a solution of polymer particles. The dental composition preferably further comprises a photopolymerization initiator.

The above-described composition of the present invention whose application is limited to a dental application as a preferred embodiment is defined as a dental composition. Therefore, the components (dissolving medium, polymer particle solution, photopolymerization initiator, and the like) contained in the dental composition are the same as those described above for the composition of the present invention, and thus the detailed description thereon is omitted.

The dental composition is suitably used as a composite resin for treating tooth defects and dental caries. When a tooth defect or a dental caries is treated in dental treatment, a cavity is formed in the tooth by scraping off a part of the tooth. By filling this cavity with a dental composition and then curing it, the tooth can be restored to its original shape before the dental treatment.

In the present invention, by using the above-described polymer particles as a thickener, the viscosity of the dental composition can be adjusted to a desired range, whereby a dental composition preferably in a paste-like form can be obtained. As described above, the polymer particles can be uniformly dissolved in a dissolving medium without generating an unmixed lump, and can uniformly increase the viscosity of the dental composition. Furthermore, using the polymer particles, it is also possible to, after uniformly increasing the viscosity of the dental composition, stably maintain a uniform state of the increased viscosity. Such a dental composition is superior in filling property and stretch fluidity, and also has a reduced degree of occurrence of stickiness or stringing.

The dental composition of the present invention is superior in filling property, which makes it possible to fill the dental composition into a cavity formed in a tooth while reducing the formation of bubbles in the cavity. The internal surface of the cavity generally has fine irregularities, and when filling the dental composition into the cavity of the tooth, the dental composition also needs to sufficiently flow into recesses of the fine irregularities of the internal surface of the cavity. However, if the dental composition contains an unmixed lump or the viscosity of the dental composition is uneven, such a dental composition may not sufficiently flow into recesses of fine irregularities of the internal surface of a cavity and bubbles may be formed between the internal surface of the tooth cavity and the filled dental composition. Such bubbles may reduce the adhesion strength between the internal surface of the cavity of the tooth and the filled dental composition, causing a cured dental composition to fall off the tooth. However, the dental composition of the present invention is superior in filling property, and when filling the dental composition into a cavity of a tooth, the dental composition can sufficiently flow into recesses on the inner surface of the cavity of the tooth and reduce the formation of bubbles.

In addition, dental compositions are superior in stretch fluidity, and can uniformly stretch and flow. If a dental composition contains an unmixed lump, the unmixed lump may partially inhibit flow of the dental composition, resulting in uneven stretch fluidity of the dental composition, which may make it difficult to uniformly fill the dental composition into a cavity of a tooth. In addition, when the viscosity of a dental composition is uneven, the stretch fluidity of the dental composition is also uneven, and it may be difficult to uniformly fill the dental composition into a cavity of a tooth. However, since the dental composition of the present invention is superior in stretch fluidity and can be uniformly stretched and flow, such a dental composition can be easily and uniformly filled into a cavity of a tooth.

Furthermore, the dental composition has a reduced degree of occurrence of stickiness or stringing, and is superior in operability. When a dental composition contains an unmixed lump, stickiness may occur with the dental composition. In addition, when the viscosity of the dental composition is uneven, a phenomenon called stringing may occur with the dental composition. In dental treatment is performed such an operation as scooping a dental composition with a dental instrument such as a spatula or a probe before filling the dental composition, or removing an excessively filled dental composition with a dental instrument after filling the dental composition. When stickiness or stringing occurs with the dental composition, it is difficult to perform the above operation in dental treatment. However, the dental composition of the present invention has a reduced degree of occurrence of stickiness or stringing, and can be easily subjected to the above-described operations in dental treatment.

Furthermore, the dental composition of the present invention is a reduced degree of formation of an unmixed lump and has a uniformly increased viscosity. Accordingly, such a dental composition can be cured to form a cured product being uniform and having high mechanical strength. This makes it possible to reduce the occurrence of damage such as chipping or cracking in a cured product of the dental composition even when a stress is applied to the cured product.

The dental composition comprises a dissolving medium. The dissolving medium preferably contains a monomer that is polymerized by irradiation with ionizing radiation. By virtue of the inclusion of the monomer polymerizable by irradiation with ionizing radiation in the dissolving medium, the dental composition can be cured by polymerizing the monomer polymerizable by irradiation with ionizing radiation by irradiating the dental composition with ionizing radiation. The dissolving medium may comprise a solvent. The monomer polymerizable by the irradiation with ionizing radiation and the solvent both contained in the dental composition are as described above for the composition of the present invention, and therefore, detailed descriptions thereon are omitted.

The dental composition contains a solution of the polymer particles preferably in an amount of 10 to 100 parts by mass, and more preferably 30 to 100 parts by mass, based on 100 parts by mass of the dissolving medium. That is, the dental composition preferably contains a solution in which polymer particles in an amount of preferably 10 to 100 parts by mass, more preferably 30 to 100 parts by mass are dissolved in 100 parts by mass of a dissolving medium. By adjusting the content of the polymer particle solution to fall in the above range, a dental composition preferably in a paste-like form is obtained. As a result, a dental composition superior in filling property, stretch fluidity, and operability is obtained.

The dental composition preferably comprises a photopolymerization initiator. The photopolymerization initiator is preferably contained in the dental composition in an amount of 0.1 to 20 parts by mass, more preferably 0.5 to 10 parts by mass, and particularly preferably 0.5 to 8 parts by mass, based on 100 parts by mass of the monomer polymerizable by irradiation with ionizing radiation. The photopolymerization initiator contained in the dental composition is as described above for the composition of the present invention, and therefore, a detailed description thereon is omitted.

The dental composition may further comprise a synthetic resin, an oligomer polymerizable by irradiation with ionizing radiation, a pigment, a filler, a viscosity modifier, an antifoaming agent, a light stabilizer, a weather stabilizer, a heat stabilizer, an ultraviolet absorber, an antioxidant, a leveling agent, a pigment dispersant, a pH adjuster, a polymerization inhibitor, an antibacterial agent, an X-ray contrast agent, a fluorescent agent or the like. These are as described above for the composition of the present invention, and therefore, detailed descriptions thereon are omitted.

The method for producing a dental composition is not particularly limited, and examples thereof include a method of obtaining a dental composition by mixing a dissolving medium containing a monomer polymerizable by irradiation with ionizing radiation, polymer particles, and as necessary, a photopolymerization initiator, and dissolving the polymer particles in the dissolving medium.

The dental composition can form a cured product being uniform and having high mechanical strength, as described above. The method for forming a cured product of the dental composition is not particularly limited, and examples thereof include a method of irradiating the dental composition with ionizing radiation to obtain a cured product of the dental composition.

When a dental composition is used as a composite resin, the method for forming a cured product of the dental composition is not particularly limited, and examples thereof include a method in which a dental composition is filled in a cavity of a tooth and then the dental composition is irradiated with ionizing radiation to obtain a cured product of the dental composition.

Examples of the ionizing radiation applied to the dental composition include X-rays, γ-rays, ultraviolet rays, visible rays, electron beams, and the like; ultraviolet rays and visible rays are preferable, and ultraviolet rays are more preferable. The ionizing radiation may be used alone or in combination of two or more kinds thereof.

As the application of the dental composition of the present invention, the composite resin described above is suitably mentioned. However, the dental composition of the present invention can also be used for other applications. Examples of such other applications include dental adhesives such as an adhesive for orthodontics, an adhesive for cavity application, and a fissure sealant; denture materials such as a denture-base material, a denture-base mucosa adjusting material, a Fischer sealant, a coating material for a tooth surface or for a dental prosthesis, and a dental manicure; and the like. The cured product of the dental composition of the present invention can also be molded and used as an artificial tooth, a denture, a resin block for CAD/CAM or the like.

Advantageous Effects of Invention

The polymer particles of the present invention can be dissolved in a dissolving medium without generating an unmixed lump, and can uniformly increase the viscosity of a composition.

BRIEF DESCRIPTION OF DRAWINGS

The FIGURE is an Explanatory View of a Flexural Strength Test.

DESCRIPTION OF EMBODIMENTS

Hereinafter, the present invention will be described in more detail with reference to examples, but the present invention is not limited to the examples at all.

EXAMPLES

Example 1

A raw material mixture containing 100 parts by mass of methyl methacrylate (MMA) as a feedstock monomer and 0.4 parts by mass of benzoyl peroxide as a polymerization initiator was prepared. On the other hand, 5 parts by mass of double-decomposed magnesium pyrophosphate (magnesium pyrophosphate obtained by double decomposition) as a dispersion stabilizer constituted by an acid soluble and poorly water soluble inorganic compound, 0.02 parts by mass of sodium nitrite as an aqueous polymerization stabilizer, and 0.10 parts by mass of sodium lauryl sulfate as a surfactant were added to 200 parts by mass of deionized water as an aqueous medium and mixed, and thus, an aqueous medium mixture was prepared.

The raw material mixture and the aqueous medium mixture were fed to a high-speed emulsifier/disperser HOMOGENIZING MIXER (trade name "MARK II Model 2.5" manufactured by PRIMIX Corporation), and the aqueous medium was stirred and mixed while the droplet diameter of the raw material mixture (oil phase) in the aqueous medium (aqueous phase) was adjusted to 3 to 5 μm, and thus a dispersion liquid in which the raw material mixture was dispersed in the aqueous medium in the form of droplets was obtained.

The dispersion liquid was fed to a polymerization reactor (autoclave) equipped with a stirrer and a temperature controller including a heating apparatus, and the dispersion liquid was heated to 70° C. as a polymerization standard temperature using the heating apparatus while being stirred by the stirrer to perform suspension polymerization of the feedstock monomer (polymerization step). In the polymerization step, the temperature of the dispersion liquid periodically fluctuated up and down around 70° C. by temperature control by a temperature controller. In the polymerization step, the temperature of the dispersion liquid attained when the polymerization conversion rate of the feedstock monomer was 10% or more and less than 50% was 69.7° C. at the minimum and 70.3° C. at the maximum.

In the vicinity of the polymerization end point at which the polymerization conversion rate of the feedstock monomer was 98% or more, the temperature of the dispersion liquid exceeded 70.3° C. and a heat generation step occurred. Therefore, the temperature of the dispersion liquid was controlled to be 71° C. or lower by a temperature controller. When the temperature of the dispersion liquid became lower than 70.3° C., it was determined that the heat generation step was completed. Suspension polymerization was continued even after the heat generation step was completed. Also, in the polymerization step after completion of the heat generation step, the temperature of the dispersion liquid was 69.7° C. at the minimum and 70.3° C. at the maximum. Suspension polymerization was performed for 3 hours after the heat generation step was started, and thus a suspension in which polymethyl methacrylate particles as polymer particles were dispersed in water was obtained.

The obtained suspension was cooled to room temperature, and then hydrochloric acid was added to the suspension to decompose the dispersion stabilizer (double-decomposed magnesium pyrophosphate). Thereafter, the polymer particles were separated from the aqueous medium by a pressurized separator, and the obtained polymer particles were washed with ion-exchanged water. The washed polymer particles were placed in a vacuum dryer and heated and dried.

Next, the dried polymer particles were subjected to air flow classification. Specifically, the polymer particles were fed to a classification rotor type air flow classifier (trade name "Turbo Classifier (registered trademark) TC-25" manufactured by Nisshin Engineering Inc.), classification was performed using a fine powder rotor as the classification rotor, so that fine particles having a small particle diameter were removed such that the coefficient of variation in a number-based particle size distribution was not less than 30% (fine particle removal step). Subsequently, the polymer particles were fed to a blow-through type high-performance sieving machine (trade name "Hi-BOLTER" manufactured by Toyo Hitec Co., Ltd.) and subjected to classification, so that coarse particles having a large particle diameter were removed such that the coefficient of variation in a number-based particle size distribution was not less than 30% (coarse particle removal step). As a result, polymer particles after classification were obtained.

Example 2

Polymer particles after classification were obtained in the same manner as in Example 1 except that the blending amount of sodium lauryl sulfate as a surfactant was set to 0.05 parts by mass, and the aqueous medium was stirred and mixed while adjusting the droplet diameter of the raw material mixture (oil phase) in the aqueous medium (aqueous phase) to be more than 3 μm and 5 μm or less.

Example 3

Polymer particles after classification were obtained in the same manner as in Example 1 except that the blending amount of sodium lauryl sulfate as a surfactant was set to 0.05 parts by mass, and the aqueous medium was stirred and mixed while adjusting the droplet diameter of the raw material mixture (oil phase) in the aqueous medium (aqueous phase) to be more than 7 μm and 9 μm or less.

Example 4

Polymer particles after classification were obtained in the same manner as in Example 1 except that ethyl methacrylate (EMA) was used as a feedstock monomer instead of methyl methacrylate, the blending amount of sodium lauryl sulfate as a surfactant was set to 0.05 parts by mass, and the aqueous medium was stirred and mixed while adjusting the droplet diameter of the raw material mixture (oil phase) in the aqueous medium (aqueous phase) to be more than 3 μm and 5 μm or less.

Example 5

Polymer particles after classification were obtained in the same manner as in Example 1 except that ethyl methacrylate was used as a feedstock monomer instead of methyl methacrylate, the blending amount of sodium lauryl sulfate as a surfactant was set to 0.05 parts by mass, and the aqueous medium was stirred and mixed while adjusting the droplet diameter of the raw material mixture (oil phase) in the aqueous medium (aqueous phase) to be 17 to 20 μm.

Example 6

Polymer particles after classification were obtained in the same manner as in Example 1 except that a raw material mixture containing 100 parts by mass of isobutyl methacrylate (IBMA) as a feedstock monomer, 0.05 parts by mass of α-methylstyrene dimer as a molecular weight regulator, and 0.4 parts by mass of benzoyl peroxide as a polymerization initiator was prepared, the blending amount of sodium lauryl sulfate as a surfactant was set to 0.02 parts by mass, and the aqueous medium was stirred and mixed while adjusting the droplet diameter of the raw material mixture (oil phase) in the aqueous medium (aqueous phase) to be 45 to 50 μm.

Example 7

Polymer particles after classification were obtained in the same manner as in Example 1 except that a raw material mixture containing 50 parts by mass of methyl methacrylate and 50 parts by mass of ethyl methacrylate as a feedstock monomer, 0.6 parts by mass of α-methylstyrene as a molecular weight regulator, and 0.4 parts by mass of benzoyl peroxide as a polymerization initiator was prepared, the blending amount of sodium lauryl sulfate as a surfactant was set to 0.02 parts by mass, and the aqueous medium was stirred and mixed while adjusting the droplet diameter of the raw material mixture (oil phase) in the aqueous medium (aqueous phase) to be 30 to 35 μm.

Example 8

Polymer particles after classification were obtained in the same manner as in Example 1 except that a raw material mixture containing 50 parts by mass of methyl methacrylate and 50 parts by mass of ethyl methacrylate as a feedstock monomer, 0.6 parts by mass of α-methylstyrene as a molecular weight regulator, and 0.4 parts by mass of benzoyl peroxide as a polymerization initiator was prepared, the blending amount of sodium lauryl sulfate as a surfactant was set to 0.02 parts by mass, and the aqueous medium was stirred and mixed while adjusting the droplet diameter of the raw material mixture (oil phase) in the aqueous medium (aqueous phase) to be 45 to 50 μm.

Example 9

Polymer particles after classification were obtained in the same manner as in Example 1 except that styrene (St) was used as a feedstock monomer instead of methyl methacrylate, the blending amount of sodium lauryl sulfate as a surfactant was set to 0.05 parts by mass, and the aqueous medium was stirred and mixed while adjusting the droplet diameter of the raw material mixture (oil phase) in the aqueous medium (aqueous phase) to be 17 to 20 μm.

Comparative Example 1

Polymer particles were obtained in the same manner as in Example 1 except that neither the coarse particle removal step nor the fine particle removal step were performed.

Comparative Example 2

Polymer particles after classification were obtained in the same manner as in Example 1 except that the fine particle removal step was not performed.

Comparative Example 3

Polymer particles after classification were obtained in the same manner as in Example 1 except that the coarse particle removal step was not performed.

Comparative Example 4

Polymer particles after classification were obtained in the same manner as in Example 2 except that coarse particles and fine particles were removed such that the coefficient of variation in a number-based particle size distribution was 30% or less in the coarse particle removal step and the fine particle removal step.

Comparative Example 5

[Production of Seed Particles]

900 parts by mass of deionized water as an aqueous medium, 160 parts by mass of ethyl methacrylate, and 3.2 parts by mass of n-octyl mercaptan as a molecular weight regulator were fed to a separable flask equipped with a stirrer, a thermometer, and a reflux condenser, the inside of the separable flask was replaced with nitrogen while the contents of the separable flask were stirred, and the internal temperature of the separable flask was raised to 65° C. Furthermore, while the internal temperature of the separable flask was maintained at 65° C., an aqueous solution prepared by dissolving 1.0 parts by mass of potassium persulfate as a polymerization initiator in 100 parts by mass of water was added to the contents of the separable flask, and then the contents were subjected to a polymerization reaction for 12 hours. The reaction liquid after the polymerization was filtered through a 400-mesh (mesh size: 32 μm) wire mesh, and thus a raw material slurry containing 14% by mass of seed particles made of poly(ethyl methacrylate) as a solid component was prepared. The seed particles contained in the raw material slurry were spherical particles having a volume average particle diameter of 0.76 μm.

[Production of Polymer Particles]

A raw material mixture was prepared by dissolving 4 parts by mass of 2,2'-azoisobutyronitrile and 4 parts by mass of benzoyl peroxide as polymerization initiators in 1000 parts by mass of methyl methacrylate (MMA).

An aqueous medium mixture was prepared by dissolving 8 g of sodium di(2-ethylhexyl) sulfosuccinate as an anionic surfactant in 800 g of deionized water as an aqueous medium.

A mixed liquid obtained by mixing the aqueous medium mixture and the raw material mixture was fed to a HOMOGENIZING MIXER and stirred at a rotation speed of 10,000 rpm for 10 minutes, and thus an emulsion was prepared. The raw material slurry described above was added to the emulsion such that the solid content (seed particles) was 4.2 g, and the mixture was stirred at 30° C. for 5 hours, and thus a dispersion liquid was obtained.

To this dispersion liquid were added 2400 parts by mass of an aqueous solution containing 4% by mass of polyvinyl alcohol ("Gohsenol (registered trademark) GM-14L" manufactured by The Nippon Synthetic Chemical Industry Co., Ltd.) as a polymer dispersion stabilizer and 0.64 parts by mass of sodium nitrite as a polymerization inhibitor, and then the mixture was stirred at 60° C. for 5 hours and then at 105° C. for 3 hours to undergo a polymerization reaction, and thus a slurry containing polymer particles (hereinafter referred to as slurry (1)) was obtained.

Thereafter, polymer particles were separated from the slurry (1) by a pressurized separator, and the obtained polymer particles were washed with ion-exchanged water. The washed polymer particles were placed in a vacuum dryer and heated and dried.

Next, the polymer particles after drying were subjected to air flow classification in the same manner as in Example 1 except that coarse particles and fine particles were removed such that the coefficient of variation in a number-based particle size distribution was 30% or less in the coarse particle removal step and the fine particle removal step. As a result, polymer particles after classification were obtained.

Comparative Example 6

Polymer particles after classification were obtained in the same manner as in Example 1 except that in the heat generation step, the temperature of the dispersion liquid was controlled to be 72.7° C. or lower by a temperature controller, and the maximum temperature of the dispersion liquid in the heat generation step was adjusted to 72.7° C.

For the polymer particles before classification obtained in Examples 1 to 9 and Comparative Examples 2 to 6, the number average particle diameter, the coefficient of variation (CV) in a number-based particle size distribution, and the particle diameter (D5') corresponding to a cumulative number percentage of 5% counted from the small diameter side in a number-based particle size distribution were shown in the columns under "Before classification" in Table 1, respectively.

For the polymer particles after classification obtained in Examples 1 to 9 and Comparative Examples 2 to 6 and the polymer particles before classification obtained in Comparative Example 1, the number average particle diameter, the coefficient of variation (CV) in a number-based particle size distribution, the particle diameter (D5) corresponding to a cumulative number percentage of 5% counted from the small diameter side in a number-based particle size distribution, the particle diameter of 5 times the number average particle diameter (also simply referred to as "5-times particle diameter"), and the content of large particles in the polymer particles are shown in the columns under "After classification" in Table 1, respectively.

For each of the polymer particles after classification obtained in Examples 1 to 9 and Comparative Examples 2 to 6 and the polymer particles before classification obtained in Comparative Example 1, the large particles contained in the polymer particles were contained within a range in which the cumulative number percentage was 95% or more counted from the small diameter side in the number-based particle size distribution of the polymer particles.

For the polymer particles after classification obtained in Examples 1 to 9 and Comparative Examples 2 to 6 and the polymer particles before classification obtained in Comparative Example 1, the weight average molecular weight (A) of the whole polymer particles, the weight average molecular weight (B) of the small particles, and the weight average molecular weight (C) of the large particles are shown in Table 1, respectively.

[Measurement of Weight Average Molecular Weight and Number Average Particle Diameter of Each Particle Contained in Polymer Particles]

Any one of the polymer particles after classification obtained in Examples and the polymer particles before classification obtained in Comparative Example 1 was chosen as polymer particles to be measured. The chosen polymer particles were classified by feeding them to a classification rotor type air flow classifier (trade name "Turbo Classifier (registered trademark) TC-25" manufactured by Nisshin Engineering Inc.) and classified into polymer particles having the particle diameter ranges shown below [particles (1), first intermediate particles, second intermediate particles, particles (4)].

Particles (1): polymer particles having a cumulative number percentage of 20% or less counted from the small diameter side in the number-based particle size distribution of the polymer particles First intermediate particles: polymer particles having a cumulative number percentage of more than 20% and 50% or less counted from the small diameter side in the number-based particle size distribution of the polymer particles Second intermediate particles: polymer particles having a cumulative number percentage of more than 50% and 80% or less counted from the small diameter side in the number-based particle size distribution of the polymer particles Particles (4): polymer particles having a cumulative number percentage of more than 80% and 100% or less counted from the small diameter side in the number-based particle size distribution of the polymer particles The number average particle diameter of each of the particles (1), the first intermediate particles, the second intermediate particles, and the particles (4) was measured in the same manner as in the above-described method for measuring the number average particle diameter of polymer particles. The obtained results are shown in the column of the number average particle diameter of each polymer particles in Table 2. Furthermore, each of the weight average molecular weight of the particles (1), the weight average molecular weight (D) of the first intermediate particles, the weight average molecular weight (E) of the second intermediate particles, and the weight average molecular weight of the particles (4) was measured in the same manner as in the above-described method for measuring the weight average molecular weight of the whole polymer particles. The obtained results are shown in the column of the weight average molecular weight of each polymer particles in Table 2.

Then, a value (D/A) obtained by dividing the weight average molecular weight (D) of the first intermediate particles by the weight average molecular weight (A) of the whole polymer particles, a value (E/A) obtained by dividing the weight average molecular weight (E) of the second intermediate particles by the weight average molecular weight (A) of the whole polymer particles, a value (D/B) obtained by dividing the weight average molecular weight (D) of the first intermediate particles by the weight average molecular weight (B) of the small particles, a value (E/D) obtained by dividing the weight average molecular weight (E) of the second intermediate particles by the weight average molecular weight (D) of the first intermediate particles, and a value (C/E) obtained by dividing the weight average molecular weight (C) of the large particles by the weight average molecular weight (E) of the second intermediate particles are shown in Table 2, respectively.

[Evaluation of Thickening Effect]

For the polymer particles after classification obtained in Examples and Comparative Examples and the polymer particles before classification obtained in Comparative Example 1, the thickening effect in the case of using toluene, methyl methacrylate or cyclohexane as a dissolving medium was evaluated in accordance with the following procedure.

(Viscosity Measurement of Composition (1) Containing Polymer Particles: Toluene)

Composition (1) containing 20 g of polymer particles and 100 g of toluene and a stirring bar (trade name "High Speed Cross Stirring Bar 58947-828" manufactured by AS ONE Corporation) were put in a 200 mL beaker. Thereafter, the beaker was placed on a magnetic stirrer (trade name "REXIM Analog Type, 4 Rows, RS-4AN" manufactured by AS ONE Corporation), and the composition (1) was stirred by the stirring bar under an atmosphere of 25° C. The viscosity V1 of the composition (1) after a lapse of 0.5 hours from the start of the stirring, the viscosity V2 of the composition (1) after a lapse of 1 hour, the viscosity V3 of the composition (1) after a lapse of 1.5 hours, and the viscosity V4 of the composition (1) after a lapse of 2 hours were measured at 25° C. using a B-type viscometer (trade name "LVDV-II" manufactured by Brookfield AMETEK) and a rotor No. LV-2 as a spindle at a rotation speed of 60 rpm. The obtained results are shown in Table 3.

For the composition (1) after a lapse of 1.5 hours from the start of the stirring and the composition (1) after a lapse of 2 hours from the start of the stirring, the presence or absence of generation of a gel-like undissolved matter (an unmixed lump) was examined by visual observation. The obtained results are shown in Table 3.

(Viscosity Measurement of Composition (2) Containing Small Particles: Toluene)

Polymer particles were fed to a classification rotor type air flow classifier (trade name "Turbo Classifier (registered trademark) TC-25" manufactured by Nisshin Engineering Inc.) and classified, and thus small particles having a cumulative number percentage of 5% or less counted from the small diameter side in a number-based particle size distribution were obtained. Next, composition (2) containing 20 g of small particles and 100 g of toluene was stirred in the same manner as in the measurement of the viscosity of the composition (1) described above, and the viscosity V5 of the composition (2) after a lapse of 1.5 hours from the start of the stirring and the viscosity V6 of the composition (2) after a lapse of 2 hours from the start of the stirring were measured. The obtained results are shown in Table 3.

(Viscosity Measurement of Composition (3) Containing Large Particles: Toluene)

Polymer particles were fed to a classification rotor type air flow classifier (trade name "Turbo Classifier (registered trademark) TC-25" manufactured by Nisshin Engineering Inc.) and classified, and thus polymer particles (I) having a cumulative number percentage of 95% or more counted from the small diameter side in a number-based particle size distribution were obtained. Next, composition (3) containing 20 g of the polymer particles (I) and 100 g of toluene was stirred in the same manner as in the measurement of the viscosity of the composition (1) described above, and the viscosity V7 of the composition (3) after a lapse of 1.5 hours from the start of the stirring and the viscosity V8 of the composition (3) after a lapse of 2 hours from the start of the stirring were measured. The obtained results are shown in Table 3.

When the ratio [V7/V5] of the viscosity V7 of the composition (3) after a lapse of 1.5 hours from the start of stirring to the viscosity V5 of the composition (2) after a lapse of 1.5 hours from the start of stirring is within the range of 0.9 to 1.1, it can be evaluated that the polymer particles have superior thickening stability. In a case where the ratio [V7/V5] is out of the above range, when such polymer particles are dissolved in a dissolving medium, a portion having a low viscosity or a portion having a high viscosity is partially generated in the composition, and the viscosity is biased in the composition and is uneven.

(Measurement of Viscosity of Composition (4) Containing Polymer Particles: Methyl Methacrylate)

Composition (4) containing 20 g of polymer particles and 100 g of methyl methacrylate and a stirring bar (trade name "High Speed Cross Stirring Bar 58947-828" manufactured by AS ONE Corporation) were put in a 200 mL beaker. Thereafter, the beaker was placed on a magnetic stirrer (trade name "REXIM Analog Type, 4 Rows, RS-4AN" manufactured by AS ONE Corporation), and the composition (4) was stirred by the stirring bar under an atmosphere of 25° C. The viscosity V9 of the composition (4) after a lapse of 0.5 hours from the start of the stirring, the viscosity V10 of the composition (4) after a lapse of 1 hour, the viscosity V11 of the composition (4) after a lapse of 1.5 hours, and the viscosity V12 of the composition (4) after a lapse of 2 hours were measured at 25° C. using a B-type viscometer (trade name "LVDV-II" manufactured by Brookfield AMETEK) and a rotor No. LV-2 as a spindle at a rotation speed of 60 rpm. The obtained results are shown in Table 4.

For the composition (4) after a lapse of 1.5 hours from the start of the stirring and the composition (4) after a lapse of 2 hours from the start of the stirring, the presence or absence of generation of a gel-like undissolved matter (an unmixed lump) was examined by visual observation. The obtained results are shown in Table 4.

(Viscosity Measurement of Composition (5) Containing Small Particles: Methyl Methacrylate)

Polymer particles were fed to a classification rotor type air flow classifier (trade name "Turbo Classifier (registered trademark) TC-25" manufactured by Nisshin Engineering Inc.) and classified, and thus small particles having a cumulative number percentage of 5% or less counted from the small diameter side in a number-based particle size distribution were obtained. Next, composition (5) containing 20 g of small particles and 100 g of methyl methacrylate was stirred in the same manner as in the measurement of the viscosity of the composition (4) described above, and the viscosity V13 of the composition (5) after a lapse of 1.5 hours from the start of the stirring and the viscosity V14 of the composition (5) after a lapse of 2 hours from the start of the stirring were measured. The obtained results are shown in Table 4.

(Viscosity Measurement of Composition (6) Containing Large Particles: Methyl Methacrylate)

Polymer particles were fed to a classification rotor type air flow classifier (trade name "Turbo Classifier (registered trademark) TC-25" manufactured by Nisshin Engineering Inc.) and classified, and thus polymer particles (I) having a cumulative number percentage of 95% or more counted from the small diameter side in a number-based particle size distribution were obtained. Next, composition (6) containing 20 g of polymer particles (I) and 100 g of methyl methacrylate was stirred in the same manner as in the measurement of the viscosity of the composition (4) described above, and the viscosity V15 of the composition (6) after a lapse of 1.5 hours from the start of the stirring and the viscosity V16 of the composition (6) after a lapse of 2 hours from the start of the stirring were measured. The obtained results are shown in Table 4.

When the ratio [V15/V13] of the viscosity V15 of the composition (6) after a lapse of 1.5 hours from the start of stirring to the viscosity V13 of the composition (5) after a lapse of 1.5 hours from the start of stirring is within the range of 0.9 to 1.1, it can be evaluated that the polymer particles have superior thickening stability. In a case where the ratio [V15/V13] is out of the above range, when such polymer particles are dissolved in a dissolving medium, a portion having a low viscosity or a portion having a high viscosity is partially generated in the composition, and the viscosity is biased in the composition and is uneven.
(Viscosity Measurement of Composition (7) Containing Polymer Particles: Cyclohexane)

Composition (7) containing 20 g of polymer particles and 100 g of cyclohexane and a stirring bar (trade name "High Speed Cross Stirring Bar 58947-828" manufactured by AS ONE Corporation) were put in a 200 mL beaker. Thereafter, the beaker was placed on a magnetic stirrer (trade name "REXIM Analog Type, 4 Rows, RS-4AN" manufactured by AS ONE Corporation), and the composition (7) was stirred by the stirring bar under an atmosphere of 25° C. The viscosity V17 of the composition (7) after a lapse of 0.5 hours from the start of the stirring, the viscosity V18 of the composition (7) after a lapse of 1 hour, the viscosity V19 of the composition (7) after a lapse of 1.5 hours, and the viscosity V20 of the composition (7) after a lapse of 2 hours were measured at 25° C. using a B-type viscometer (trade name "LVDV-II" manufactured by Brookfield AMETEK) and a rotor No. LV-2 as a spindle at a rotation speed of 60 rpm. The obtained results are shown in Table 5.

For the composition (7) after a lapse of 1.5 hours from the start of the stirring and the composition (7) after a lapse of 2 hours from the start of the stirring, the presence or absence of generation of a gel-like undissolved matter (an unmixed lump) was examined by visual observation. The obtained results are shown in Table 5.
(Viscosity Measurement of Composition (8) Containing Small Particles: Cyclohexane)

Polymer particles were fed to a classification rotor type air flow classifier (trade name "Turbo Classifier (registered trademark) TC-25" manufactured by Nisshin Engineering Inc.) and classified, and thus small particles having a cumulative number percentage of 5% or less counted from the small diameter side in a number-based particle size distribution were obtained. Next, composition (8) containing 20 g of small particles and 100 g of cyclohexane was stirred in the same manner as in the measurement of the viscosity of the composition (7) described above, and the viscosity V21 of the composition (8) after a lapse of 1.5 hours from the start of the stirring and the viscosity V22 of the composition (8) after a lapse of 2 hours from the start of the stirring were measured. The obtained results are shown in Table 5.
(Viscosity Measurement of Composition (9) Containing Large Particles: Cyclohexane)

Polymer particles were fed to a classification rotor type air flow classifier (trade name "Turbo Classifier (registered trademark) TC-25" manufactured by Nisshin Engineering Inc.) and classified, and thus polymer particles (I) having a cumulative number percentage of 95% or more counted from the small diameter side in a number-based particle size distribution were obtained. Next, composition (9) containing 20 g of the polymer particles (I) and 100 g of cyclohexane was stirred in the same manner as in the measurement of the viscosity of the composition (7) described above, and the viscosity V23 of the composition (9) after a lapse of 1.5 hours from the start of the stirring and the viscosity V24 of the composition (9) after a lapse of 2 hours from the start of the stirring were measured. The obtained results are shown in Table 5.

When the ratio [V23/V21] of the viscosity V23 of the composition (9) after a lapse of 1.5 hours from the start of stirring to the viscosity V21 of the composition (8) after a lapse of 1.5 hours from the start of stirring is within the range of 0.9 to 1.1, it can be evaluated that the polymer particles have superior thickening stability. In a case where the ratio [V23/V21] is out of the above range, when such polymer particles are dissolved in a dissolving medium, a portion having a low viscosity or a portion having a high viscosity is partially generated in the composition, and the viscosity is biased in the composition and is uneven.
[Evaluation of Coating Composition]

Furthermore, for the polymer particles after classification obtained in Examples and Comparative Examples and the polymer particles before classification obtained in Comparative Example 1, a coating composition and a coating film were prepared and evaluated in accordance with the following procedure.

20 parts by mass of polymer particles, 100 parts by mass of toluene, and a stirring bar (trade name "High Speed Cross Stirring Bar 58947-828" manufactured by AS ONE Corporation) were put in a 200 mL beaker. Thereafter, the beaker was placed on a magnetic stirrer (trade name "REXIM Analog Type, 4 Rows, RS-4AN" manufactured by AS ONE Corporation), and the stirring bar was rotated under an atmosphere of 25° C. for 2 hours to dissolve the polymer particles in toluene, and then the stirring bar was removed and a coating composition was obtained. The obtained coating composition was applied to a polyethylene terephthalate (PET) film (thickness: 100 µm, trade name "FUJIX (registered trademark) OHP film for copiers" manufactured by FUJIFILM Corporation) using a slit coater such that the film thickness after application was 75 µm, and thus an applied film was obtained. The applied film was placed in a dryer whose temperature was maintained at 70° C. and dried for 10 minutes, and a coating film was obtained. As a result, a coated body having a PET film and a coating film integrally laminated on the surface of the PET film was obtained. Thereafter, the coated body was cut and a planar square test piece being 10 cm on each side was obtained. The back surface of the PET film in the test piece was irradiated with light by a fluorescent lamp, and the surface of the coating film at this time was visually observed and evaluated according to the following criteria. The results are shown in the column of "Evaluation of coating film" in Table 3.

A: No white spots or application spots occurred.
B: There were white spots and application spots at 1 to 5 points in total.
C: There are white spots and application spots at 6 or more points in total.

When a coating composition contains an unmixed lump, the unmixed lump causes white spots in a coating film and causes poor appearance. In addition, when the viscosity in a coating composition is uneven, a portion uneven in thickness (application spot) is generated in a coating film, and light passing through the coating film becomes uneven, which causes poor appearance.
[Evaluation of Dental Composition]

Furthermore, for the polymer particles after classification obtained in Examples and Comparative Examples or the polymer particles before classification obtained in Comparative Example 1, a dental composition was prepared in accordance with the following procedure, and the operability of the dental composition and the variation in 1% compressive strength and the flexural strength of a cured product of the dental composition were evaluated in accordance with the following procedures.
(Preparation of Dental Composition)

30 parts by mass of polymer particles, 70 parts by mass of methyl methacrylate as a monomer polymerizable by irradiation with ionizing radiation, and 0.5 parts by mass of 2-methyl-1-(4-methylthiophenyl)-2-morpholinopropan-1-one (trade name "IRGACURE (registered trademark) 907" manufactured by BASF Japan Ltd.) as a photopolymerization initiator were mixed for 5 minutes to dissolve the polymer particles in methyl methacrylate, and thus a paste-like dental composition was obtained.

(Evaluation of Operability)

An aluminum container (product name "A1070-D" manufactured by Toyo Aluminium Ekco Products Co., Ltd.) was prepared. The aluminum container includes a bottom having a circular planar shape, and a peripheral wall integrally formed upward and obliquely outward on the entire periphery of the bottom. The peripheral wall is formed in a sawtooth blade shape in a cross section in which a plurality of A-shaped mountain folds and a plurality of V-shaped valley folds are alternately repeated in the circumferential direction. Then, the dental composition prepared above was filled into an aluminum container using a spatula such that the thickness of the dental composition after filling was 5 mm. The operability of the dental composition at the time of filling was evaluated according to the following criteria. The results are shown in the column of "Evaluation of operability" in Table 6.

5: The filling property of the dental composition was particularly superior, the stretch fluidity of the dental composition was good, and the dental composition was operable without causing stickiness or stringing with the dental composition.
4: The filling property of the dental composition was superior, the stretch fluidity of the dental composition was good, and the dental composition was operable without causing stickiness or stringing with the dental composition.
3: The filling property of the dental composition was sufficient, the stretch fluidity of the dental composition was sufficient, and the dental composition was operable without causing stickiness or stringing with the dental composition.
2: The dental composition was insufficient in filling property and stretch fluidity, and stickiness and stringing occurred with the dental composition, resulting in insufficient operability of the dental composition.
1: The dental composition was particularly insufficient in filling property and stretch fluidity, and stickiness and stringing occurred with the dental composition, resulting in particularly insufficient operability of the dental composition.

The filling property of the dental composition was evaluated by visually observing whether or not, when the dental composition was filled in an aluminum container, the dental composition flowed into a plurality of recesses having a V-shaped cross section and formed on the inner surface of the peripheral wall of the aluminum container without forming bubbles, and the entire aluminum container was uniformly filled with the dental composition. In addition, the stretch fluidity of the dental composition was evaluated by evaluating whether the dental composition could be uniformly stretched and flowed when the dental composition was filled in the aluminum container.

(Evaluation of 1% Compression Strength Variation)

The prepared dental composition was irradiated with ultraviolet rays at an irradiation intensity of 0.1 W/cm$^2$ and an integrated light amount of 0.1 J/cm$^2$ for 1 hour to cure the dental composition, and a test piece made of a cured product of the dental composition was obtained. The shape of the test piece was a planar circular shape having a diameter of 40 mm and a thickness of 5 mm.

The 1% compressive strength of the test piece was measured under the following measurement conditions using a micro compression tester "MCTM-200" manufactured by Shimadzu Corporation. The test piece is placed on a lower pressure plate, and the upper pressure indenter disposed on the test piece is lowered at the load speed shown below to gradually compress the test piece until the maximum load reaches 50 gf. Then, a load P (kgf) applied at the time when the test piece was compressed by 1% based on the thickness of the test piece before compression was measured, and a 1% compression strength (kgf/mm$^2$) was calculated based on the following formula (I). When the 1% compressive strength is measured, the loading speed of the upper pressure indenter and the maximum load applied to the test piece can be appropriately adjusted according to the hardness of the test piece.

(Conditions of 1% Compression Strength Measurement)
  Measuring instrument: micro compression tester "MCTM-200" manufactured by Shimadzu Corporation
  Measurement environment: under an atmosphere of 20 to 25° C. and under an environment with a relative humidity of 65%
  Upper pressure indenter: flat indenter having a diameter of 0.5 mm (material: diamond)
  Lower pressure plate: SKS flat plate
  Test type: compression test (MODE 1)
  Loading speed: 0.0746 gf/sec (Calculation Formula for 1% Compression Strength)

$$1\% \text{ Compressive strength (kgf/mm}^2) = \text{load } P \text{ (kgf)}/(0.5 \text{ mm} \times 0.5 \text{ mm})  \quad \text{Formula (I)}$$

In the same procedure as described above, 1% compressive strength was measured at 20 arbitrary positions of the test piece. For the 20 measured values of 1% compressive strength, an arithmetic mean value S of 14 measured values excluding the highest measured value, the second highest measured value, the lowest measured value, and the second lowest measured value were calculated.

The absolute value $T_1$ of the difference between the highest 1% compressive strength (maximum value) and the arithmetic mean value S was calculated. The absolute value $T_2$ of the difference between the lowest 1% compressive strength (minimum value) and the arithmetic mean value S was calculated. Of the absolute values $T_1$ and $T_2$, the larger absolute value was selected. The "deviation" was calculated based on the following formula using the selected absolute value and the arithmetic mean value S. The deviation was evaluated according to the following evaluation criteria. The results are shown in Table 6.

$$\text{Deviation} = \text{selected absolute value/arithmetic mean value } S$$

(Evaluation Criteria for Deviation of 1% Compression Strength)
  A: The deviation was less than 0.10.
  B: The deviation was 0.10 or more and 0.20 or less.
  C: The deviation was more than 0.20.

(Evaluation of Flexural Strength)

The prepared dental composition was irradiated with ultraviolet rays at an irradiation intensity of 0.1 W/cm$^2$ and an integrated light amount of 0.1 J/cm$^2$ for 1 hour to cure the dental composition, and a test piece made of a cured product of the dental composition was obtained. The shape of the test piece was a planar rectangular shape having a length of 40 mm, a width of 10 mm, and a thickness of 5 mm.

The test piece 10 was placed on a horizontal stage J. As shown in the FIGURE, the test piece 10 on the horizontal stage J, a portion from one end edge X to 30 mm in the long side direction was fixed using a support tool (not shown) to form a fixed portion, and the remaining portion was defined as a free portion, so that the free portion was made bendable in the vertical direction.

The free portion of the test piece 10 was bent downward until the angle θ at which the tangential line ($L_1$) of the surface of the fixed portion of the test piece 10 intersects the tangential line ($L_2$) of the surface of the free portion of the test piece 10 became 60° then held for 2 seconds, and then the free portion was returned to its original state so as to be in the horizontal direction. This operation was defined as one cycle, and five cycles were performed. The free portion of the test piece 10 was visually observed and evaluated according to the following criteria. The results are shown in the column of "Evaluation of flexural strength" in Table 6.

A: Neither cracks nor a whitened part was generated in the free portion of the test piece.
B: Cracks or a whitened part was generated in the free portion of the test piece.
C: Both cracks and a whitened part were generated in the free portion of the test piece.

In a case where a dental composition contains an unmixed lump, when a bending stress is applied to a cured product of the dental composition, cracks may be generated with the unmixed lump as a starting point. In a case where the viscosity of a dental composition is uneven, when a bending stress is applied to a cured product of the dental composition, the followability to the bending stress of the cured product is disordered, and a whitened part is generated.

TABLE 1

| | Composition (parts by mass) | | | | Before classification | | | After classification | |
|---|---|---|---|---|---|---|---|---|---|
| | | | | | Number average particle diameter | Coefficient of variation (CV) | Particle diameter (D5') | Number average particle diameter | Coefficient of variation (CV) |
| | MMA | EMA | IBMA | St | [μm] | [%] | [μm] | [μm] | [%] |
| Example 1 | 100 | 0 | 0 | 0 | 2.9 | 48 | 1.04 | 3.0 | 44 |
| Example 2 | 100 | 0 | 0 | 0 | 4.2 | 54 | 1.40 | 4.3 | 51 |
| Example 3 | 100 | 0 | 0 | 0 | 6.6 | 87 | 2.04 | 7.8 | 75 |
| Example 4 | 0 | 100 | 0 | 0 | 3.7 | 67 | 1.04 | 4.0 | 64 |
| Example 5 | 0 | 100 | 0 | 0 | 17.0 | 60 | 3.2 | 17.7 | 57 |
| Example 6 | 0 | 0 | 100 | 0 | 37.2 | 83 | 5.8 | 45.3 | 75 |
| Example 7 | 50 | 50 | 0 | 0 | 32.0 | 82 | 6.0 | 32.3 | 75 |
| Example 8 | 50 | 50 | 0 | 0 | 38.5 | 85 | 6.1 | 47.3 | 74 |
| Example 9 | 0 | 0 | 0 | 100 | 17.0 | 75 | 5.5 | 17.5 | 71 |
| Comparative Example 1 | Example 1 - Fine/coarse particles were not classified | | | | — | — | — | 2.9 | 48 |
| Comparative Example 2 | Example 1 - Fine particles were not classified | | | | 2.9 | 48 | 1.04 | 2.8 | 47 |
| Comparative Example 3 | Example 1 - Coarse particles were not classified | | | | 2.9 | 48 | 1.04 | 3.0 | 48 |
| Comparative Example 4 | Example 2 - Fine/coarse particles were classified | | | | 4.4 | 35 | 2.20 | 6.3 | 29 |
| Comparative Example 5 | Monodispersive particles | | | | 2.9 | 23 | 2.5 | 2.6 | 14 |
| Comparative Example 6 | Temperature of dispersion liquid in heat generation step: 72.7° C. or lower | | | | 2.8 | 49 | 1.05 | 3.2 | 45 |

| | After classification | | | | Molecular weight | | | | | |
|---|---|---|---|---|---|---|---|---|---|---|
| | Small particles | | Large particles | | Weight average molecular weight (A) of whole polymer [×10³] | Weight average molecular weight (B) of small particles [×10³] | | Weight average molecular weight (C) of large particles [×10³] | | |
| | Particle diameter (D5) [μm] | Particle diameter ratio (D5)/(D5') | 5-times particle diameter [μm] | Content of large particles [%] | | | (B/A) | | (C/A) | (C/B) |
| Example 1 | 1.28 | 1.23 | 15.0 | 0.01 | 1070 | 1055 | 0.986 | 1134 | 1.060 | 1.075 |
| Example 2 | 1.90 | 1.36 | 21.5 | 0.01 | 1433 | 1421 | 0.992 | 1489 | 1.039 | 1.048 |
| Example 3 | 2.35 | 1.15 | 39.0 | 0.05 | 1377 | 1305 | 0.948 | 1411 | 1.025 | 1.081 |
| Example 4 | 1.16 | 1.12 | 20.0 | 0.01 | 261 | 243 | 0.931 | 285 | 1.092 | 1.173 |
| Example 5 | 3.40 | 1.06 | 88.5 | 0.01 | 255 | 230 | 0.902 | 279 | 1.094 | 1.213 |
| Example 6 | 6.10 | 1.05 | 226.5 | 0.07 | 913 | 902 | 0.988 | 955 | 1.046 | 1.059 |
| Example 7 | 6.20 | 1.03 | 161.5 | 0.08 | 513 | 509 | 0.992 | 522 | 1.018 | 1.026 |
| Example 8 | 6.30 | 1.03 | 236.5 | 0.01 | 524 | 520 | 0.992 | 543 | 1.036 | 1.044 |
| Example 9 | 5.90 | 1.07 | 87.5 | 0.02 | 144 | 141 | 0.979 | 149 | 1.035 | 1.057 |
| Comparative Example 1 | 1.04 | — | 14.5 | 0.10 | 1096 | 687 | 0.627 | 3455 | 3.152 | 5.029 |
| Comparative Example 2 | 1.05 | 1.01 | 14.0 | 0.02 | 1080 | 743 | 0.688 | 1134 | 1.050 | 1.526 |
| Comparative Example 3 | 1.24 | 1.19 | 15.0 | 0.11 | 1077 | 1043 | 0.968 | 3555 | 3.301 | 3.301 |
| Comparative Example 4 | 2.80 | 1.27 | 31.5 | 0.01 | 1453 | 1423 | 0.979 | 1498 | 1.031 | 1.053 |
| Comparative Example 5 | 2.5 | 1.00 | 13.0 | 0.01 | 735 | 734 | 0.999 | 744 | 1.012 | 1.014 |
| Comparative Example 6 | 1.30 | 1.24 | 16.0 | 0.01 | 1398 | 1276 | 0.913 | 1663 | 1.190 | 1.303 |

TABLE 2

|  |  | Particles (1) | First intermediate particles | Second intermediate particles | Particles (4) | (D/A) | (E/A) | (D/B) | (E/D) | (C/E) |
|---|---|---|---|---|---|---|---|---|---|---|
| Example 1 | Number average particle diameter [μm] | 1.3 | 1.9 | 3.5 | 4.9 | | | | | |
| | Weight average molecular weight [×10³] | 1060 | 1065 | 1080 | 1130 | 0.995 | 1.009 | 1.009 | 1.014 | 1.050 |
| Example 2 | Number average particle diameter [μm] | 1.8 | 2.5 | 4.5 | 5.8 | | | | | |
| | Weight average molecular weight [×10³] | 1423 | 1429 | 1455 | 1485 | 0.997 | 1.015 | 1.006 | 1.018 | 1.023 |
| Example 3 | Number average particle diameter [μm] | 2.5 | 5.2 | 9.4 | 10.5 | | | | | |
| | Weight average molecular weight [×10³] | 1325 | 1369 | 1388 | 1400 | 0.994 | 1.008 | 1.049 | 1.014 | 1.017 |
| Example 4 | Number average particle diameter [μm] | 1.7 | 2.6 | 4.4 | 6.0 | | | | | |
| | Weight average molecular weight [×10³] | 250 | 256 | 277 | 281 | 0.981 | 1.061 | 1.053 | 1.082 | 1.029 |
| Example 5 | Number average particle diameter [μm] | 3.5 | 6.6 | 20.1 | 23.5 | | | | | |
| | Weight average molecular weight [×10³] | 231 | 248 | 264 | 276 | 0.973 | 1.035 | 1.078 | 1.065 | 1.057 |
| Example 6 | Number average particle diameter [μm] | 8.8 | 30.3 | 51.8 | 59.1 | | | | | |
| | Weight average molecular weight [×10³] | 903 | 910 | 933 | 950 | 0.997 | 1.022 | 1.009 | 1.025 | 1.024 |
| Example 7 | Number average particle diameter [μm] | 6.3 | 25.8 | 35.9 | 45.9 | | | | | |
| | Weight average molecular weight [×10³] | 510 | 512 | 519 | 521 | 0.998 | 1.012 | 1.006 | 1.014 | 1.006 |
| Example 8 | Number average particle diameter [μm] | 8.9 | 33.2 | 52.5 | 61.3 | | | | | |
| | Weight average molecular weight [×10³] | 519 | 521 | 530 | 533 | 0.994 | 1.011 | 1.002 | 1.017 | 1.025 |
| Example 9 | Number average particle diameter [μm] | 3.5 | 7.1 | 21.3 | 23.7 | | | | | |
| | Weight average molecular weight [×10³] | 142 | 143 | 147 | 148 | 0.993 | 1.021 | 1.014 | 1.028 | 1.014 |
| Comparative Example 1 | Number average particle diameter [μm] | 1.2 | 2.0 | 3.6 | 7.9 | | | | | |
| | Weight average molecular weight [×10³] | 699 | 1045 | 1112 | 2544 | 0.953 | 1.015 | 1.521 | 1.064 | 3.107 |
| Comparative Example 6 | Number average particle diameter [μm] | 1.5 | 2.1 | 3.5 | 4.8 | | | | | |
| | Weight average molecular weight [×10³] | 1299 | 1328 | 1555 | 1609 | 0.950 | 1.112 | 1.041 | 1.171 | 1.069 |

TABLE 3

| | After 0.5 hours | After 1 hour | | After 1.5 hours | | | | |
|---|---|---|---|---|---|---|---|---|
| | Viscosity V1 of composition (1) [cP] | Viscosity V2 of composition (1) [cP] | Viscosity ratio [V2/V1] | Viscosity V3 of composition (1) [cP] | Viscosity ratio [V3/V1] | Viscosity ratio [V3/V2] | Generation of gel-like undissolved matter | Viscosity V5 of composition (2) [cP] |
| Example 1 | 155 | 188 | 1.21 | 225 | 1.45 | 1.20 | Absent | 211 |
| Example 2 | 170 | 200 | 1.18 | 245 | 1.44 | 1.23 | Absent | 233 |
| Example 3 | 175 | 185 | 1.06 | 227 | 1.30 | 1.23 | Absent | 220 |
| Example 4 | 125 | 153 | 1.22 | 188 | 1.50 | 1.23 | Absent | 180 |
| Example 5 | 125 | 150 | 1.20 | 180 | 1.44 | 1.20 | Absent | 171 |
| Example 6 | 135 | 162 | 1.20 | 189 | 1.40 | 1.17 | Absent | 179 |
| Example 7 | 87 | 100 | 1.15 | 123 | 1.41 | 1.23 | Absent | 116 |
| Example 8 | 90 | 101 | 1.12 | 125 | 1.39 | 1.24 | Absent | 120 |
| Example 9 | 72 | 88 | 1.22 | 104 | 1.44 | 1.18 | Absent | 100 |
| Comparative Example 1 | 150 | 205 | 1.37 | 245 | 1.63 | 1.20 | Absent | 165 |
| Comparative Example 2 | 143 | 170 | 1.19 | 200 | 1.40 | 1.18 | Absent | 169 |
| Comparative Example 3 | 180 | 230 | 1.28 | 260 | 1.44 | 1.13 | Absent | 209 |

TABLE 3-continued

| | | | | | | | | |
|---|---|---|---|---|---|---|---|---|
| Comparative Example 4 | 175 | 248 | 1.42 | 252 | 1.44 | 1.02 | Present | 248 |
| Comparative Example 5 | 150 | 231 | 1.54 | 235 | 1.57 | 1.02 | Present | 231 |

| | After 1.5 hours | | After 2 hours | | | | | |
|---|---|---|---|---|---|---|---|---|
| | Viscosity V7 of composition [](3) [cP] | Viscosity ratio [V7/V5] | Viscosity V4 of composition (1) [cP] | Viscosity ratio [V4/V3] | Generation of gel-like undis- solved matter | Viscosity V6 of composition (2) [cP] | Viscosity V8 of composition (3) [cP] | Viscosity ratio [V8/V6] | Coating film evaluation |
| Example 1 | 230 | 1.09 | 230 | 1.02 | Absent | 222 | 233 | 1.05 | A |
| Example 2 | 255 | 1.09 | 255 | 1.04 | Absent | 247 | 258 | 1.04 | A |
| Example 3 | 240 | 1.09 | 233 | 1.03 | Absent | 227 | 236 | 1.04 | A |
| Example 4 | 190 | 1.06 | 192 | 1.02 | Absent | 187 | 195 | 1.04 | A |
| Example 5 | 182 | 1.06 | 185 | 1.03 | Absent | 180 | 188 | 1.04 | A |
| Example 6 | 195 | 1.09 | 195 | 1.03 | Absent | 190 | 200 | 1.05 | A |
| Example 7 | 127 | 1.09 | 129 | 1.05 | Absent | 127 | 133 | 1.05 | A |
| Example 8 | 129 | 1.08 | 128 | 1.02 | Absent | 126 | 131 | 1.04 | A |
| Example 9 | 109 | 1.09 | 108 | 1.04 | Absent | 106 | 111 | 1.05 | A |
| Comparative Example 1 | 305 | 1.85 | 264 | 1.08 | Absent | 170 | 311 | 1.83 | C |
| Comparative Example 2 | 235 | 1.39 | 217 | 1.09 | Absent | 173 | 238 | 1.38 | C |
| Comparative Example 3 | 311 | 1.49 | 270 | 1.04 | Absent | 225 | 315 | 1.40 | B |
| Comparative Example 4 | 255 | 1.03 | 255 | 1.01 | Present | 250 | 257 | 1.03 | C |
| Comparative Example 5 | 237 | 1.03 | 238 | 1.01 | Present | 240 | 245 | 1.02 | C |

TABLE 4

| | After 0.5 hours | After 1 hour | | After 1.5 hours | | | | |
|---|---|---|---|---|---|---|---|---|
| | Viscosity V9 of composition (4) [cP] | Viscosity V10 of composition (4) [cP] | Viscosity ratio [V10/V9] | Viscosity V11 of composition (4) [cP] | Viscosity ratio [V11/V9] | Viscosity ratio [V11/V10] | Generation of gel-like undis- solved matter | Viscosity V13 of composition (5) [cP] |
| Example 1 | 173 | 200 | 1.16 | 245 | 1.42 | 1.23 | Absent | 235 |
| Example 2 | 191 | 222 | 1.16 | 275 | 1.44 | 1.24 | Absent | 269 |
| Example 3 | 195 | 225 | 1.15 | 276 | 1.42 | 1.23 | Absent | 270 |
| Example 4 | 140 | 160 | 1.14 | 185 | 1.32 | 1.16 | Absent | 182 |
| Example 5 | 143 | 158 | 1.10 | 194 | 1.36 | 1.23 | Absent | 190 |
| Example 6 | 155 | 173 | 1.12 | 195 | 1.26 | 1.13 | Absent | 190 |
| Example 7 | 113 | 136 | 1.20 | 150 | 1.33 | 1.10 | Absent | 143 |
| Example 8 | 118 | 140 | 1.19 | 157 | 1.33 | 1.12 | Absent | 152 |
| Example 9 | 101 | 128 | 1.27 | 141 | 1.40 | 1.10 | Absent | 133 |
| Comparative Example 1 | 165 | 220 | 1.33 | 261 | 1.58 | 1.19 | Absent | 180 |
| Comparative Example 2 | 150 | 180 | 1.20 | 218 | 1.45 | 1.21 | Absent | 183 |
| Comparative Example 3 | 190 | 230 | 1.21 | 270 | 1.42 | 1.17 | Absent | 230 |
| Comparative Example 4 | 194 | 275 | 1.42 | 284 | 1.46 | 1.03 | Present | 280 |
| Comparative Example 5 | 165 | 256 | 1.55 | 260 | 1.58 | 1.02 | Present | 255 |

| | After 1.5 hours | | After 2 hours | | | | | |
|---|---|---|---|---|---|---|---|---|
| | Viscosity V15 of composition (6) [cP] | Viscosity ratio [V15/V13] | Viscosity V12 of composition (4) [cP] | Viscosity ratio [V12/V11] | Generation of gel-like undis- solved matter | Viscosity V14 of composition (5) [cP] | Viscosity V16 of composition (6) [cP] | Viscosity ratio [V16/V14] |
| Example 1 | 255 | 1.09 | 250 | 1.02 | Absent | 247 | 260 | 1.05 |
| Example 2 | 280 | 1.04 | 285 | 1.04 | Absent | 281 | 290 | 1.03 |
| Example 3 | 282 | 1.04 | 288 | 1.04 | Absent | 285 | 293 | 1.03 |
| Example 4 | 193 | 1.06 | 195 | 1.05 | Absent | 192 | 202 | 1.05 |
| Example 5 | 205 | 1.08 | 200 | 1.03 | Absent | 195 | 203 | 1.04 |

TABLE 4-continued

| | | | | | | | | |
|---|---|---|---|---|---|---|---|---|
| Example 6 | 205 | 1.08 | 204 | 1.05 | Absent | 200 | 210 | 1.05 |
| Example 7 | 152 | 1.06 | 158 | 1.05 | Absent | 154 | 160 | 1.04 |
| Example 8 | 164 | 1.08 | 163 | 1.04 | Absent | 161 | 168 | 1.04 |
| Example 9 | 145 | 1.09 | 145 | 1.03 | Absent | 141 | 148 | 1.05 |
| Comparative Example 1 | 325 | 1.81 | 285 | 1.09 | Absent | 183 | 330 | 1.80 |
| Comparative Example 2 | 258 | 1.41 | 234 | 1.07 | Absent | 186 | 262 | 1.41 |
| Comparative Example 3 | 330 | 1.43 | 295 | 1.09 | Absent | 235 | 339 | 1.44 |
| Comparative Example 4 | 288 | 1.03 | 290 | 1.02 | Present | 288 | 293 | 1.02 |
| Comparative Example 5 | 261 | 1.02 | 263 | 1.01 | Present | 260 | 267 | 1.03 |

TABLE 5

| | After 0.5 hours | After 1 hour | | After 1.5 hours | | | | |
|---|---|---|---|---|---|---|---|---|
| | Viscosity V17 of composition (7) [cP] | Viscosity V18 of composition (7) [cP] | Viscosity ratio [V18/V17] | Viscosity V19 of composition (7) [cP] | Viscosity ratio [V19/V17] | Viscosity ratio [V19/V18] | Generation of gel-like undissolved matter | Viscosity V21 of composition (8) [cP] |
| Example 1 | 163 | 191 | 1.17 | 237 | 1.45 | 1.24 | Absent | 230 |
| Example 2 | 189 | 214 | 1.13 | 261 | 1.38 | 1.22 | Absent | 255 |
| Example 3 | 193 | 216 | 1.12 | 263 | 1.36 | 1.22 | Absent | 255 |
| Example 4 | 141 | 167 | 1.18 | 190 | 1.35 | 1.14 | Absent | 184 |
| Example 5 | 139 | 166 | 1.19 | 192 | 1.38 | 1.16 | Absent | 183 |
| Example 6 | 150 | 172 | 1.15 | 193 | 1.29 | 1.12 | Absent | 188 |
| Example 7 | 115 | 135 | 1.17 | 155 | 1.35 | 1.15 | Absent | 151 |
| Example 8 | 120 | 139 | 1.16 | 155 | 1.29 | 1.12 | Absent | 149 |
| Example 9 | 98 | 119 | 1.21 | 135 | 1.38 | 1.13 | Absent | 131 |
| Comparative Example 1 | 159 | 215 | 1.35 | 240 | 1.51 | 1.12 | Absent | 171 |
| Comparative Example 2 | 142 | 175 | 1.23 | 205 | 1.44 | 1.17 | Absent | 173 |
| Comparative Example 3 | 188 | 225 | 1.20 | 260 | 1.38 | 1.16 | Absent | 225 |
| Comparative Example 4 | 188 | 266 | 1.41 | 277 | 1.47 | 1.04 | Present | 272 |
| Comparative Example 5 | 151 | 240 | 1.59 | 250 | 1.66 | 1.04 | Present | 249 |

| | After 1.5 hours | | After 2 hours | | | | | |
|---|---|---|---|---|---|---|---|---|
| | Viscosity V23 of composition (9) [cP] | Viscosity ratio [V23/V21] | Viscosity V20 of composition (7) [cP] | Viscosity ratio [V20/V19] | Generation of gel-like undissolved matter | Viscosity V22 of composition (8) [cP] | Viscosity V24 of composition (9) [cP] | Viscosity ratio [V24/V22] |
| Example 1 | 250 | 1.09 | 244 | 1.03 | Absent | 247 | 260 | 1.05 |
| Example 2 | 267 | 1.05 | 266 | 1.02 | Absent | 263 | 270 | 1.03 |
| Example 3 | 269 | 1.05 | 267 | 1.02 | Absent | 263 | 275 | 1.05 |
| Example 4 | 197 | 1.07 | 197 | 1.04 | Absent | 192 | 200 | 1.04 |
| Example 5 | 196 | 1.07 | 200 | 1.04 | Absent | 196 | 203 | 1.04 |
| Example 6 | 196 | 1.04 | 202 | 1.05 | Absent | 197 | 205 | 1.04 |
| Example 7 | 160 | 1.06 | 162 | 1.05 | Absent | 159 | 166 | 1.04 |
| Example 8 | 161 | 1.08 | 161 | 1.04 | Absent | 156 | 163 | 1.04 |
| Example 9 | 141 | 1.08 | 140 | 1.04 | Absent | 137 | 144 | 1.05 |
| Comparative Example 1 | 311 | 1.82 | 265 | 1.10 | Absent | 178 | 321 | 1.80 |
| Comparative Example 2 | 249 | 1.44 | 219 | 1.07 | Absent | 178 | 259 | 1.46 |
| Comparative Example 3 | 321 | 1.43 | 279 | 1.07 | Absent | 250 | 325 | 1.30 |
| Comparative Example 4 | 279 | 1.03 | 281 | 1.01 | Present | 280 | 284 | 1.01 |
| Comparative Example 5 | 251 | 1.01 | 255 | 1.02 | Present | 253 | 259 | 1.02 |

TABLE 6

|  | Operability evaluation | 1% Compressive strength | | | | | Flexural strength evaluation |
|---|---|---|---|---|---|---|---|
|  |  | Maximum value [kgf/mm²] | Minimum value [kgf/mm²] | Arithmetic mean value [kgf/mm²] | Deviation | Evaluation | |
| Example 4 | 5 | 1.61 | 1.44 | 1.50 | 0.07 | A | A |
| Example 5 | 5 | 1.65 | 1.39 | 1.53 | 0.09 | A | A |
| Example 7 | 4 | 2.95 | 2.55 | 2.71 | 0.09 | A | A |
| Example 8 | 4 | 3.01 | 2.60 | 2.77 | 0.09 | A | A |
| Comparative Example 1 | 1 | 5.53 | 3.11 | 3.99 | 0.39 | C | C |
| Comparative Example 2 | 2 | 4.12 | 3.01 | 4.01 | 0.25 | C | B |
| Comparative Example 3 | 2 | 5.32 | 4.08 | 4.19 | 0.27 | C | C |
| Comparative Example 4 | 2 | 4.80 | 3.85 | 4.02 | 0.19 | B | B |
| Comparative Example 5 | 1 | 4.62 | 3.64 | 3.55 | 0.30 | C | B |
| Comparative Example 6 | 2 | 4.93 | 3.75 | 4.15 | 0.19 | B | B |

INDUSTRIAL APPLICABILITY

The polymer particles of the present invention can be dissolved in a dissolving medium without generating an unmixed lump, and can uniformly increase the viscosity of a composition. By using such polymer particles, it is possible to provide a composition capable of forming a coating film being uniform in thickness and composition with significantly reduced occurrence of poor appearance.

CROSS-REFERENCE TO RELATED APPLICATIONS

The present application claims the priority based on Japanese Patent Application No. 2020-060220 filed on Mar. 30, 2020, the disclosure of which is incorporated herein by reference in its entirety.

REFERENCE SIGNS LIST

10 Test piece
J Horizontal stage
X One end edge
$L_1$ Tangential line
$L_2$ Tangential line

What is claimed is:

1. Polymer particles having a number average particle diameter of 1 to 50 μm and a coefficient of variation in a number-based particle size distribution of 30% or more, wherein
where the weight average molecular weight of the whole polymer particles is defined as A,
the weight average molecular weight of small particles having a cumulative number percentage of 5% or less counted from the smaller diameter side in the number-based particle size distribution of the polymer particles is defined as B, and
the weight average molecular weight of large particles having a particle diameter of 5 times or more the number average particle diameter of the polymer particles is defined as C,
the polymer particles satisfy the following formulas (1) and (2):

$$0.90 \leq (B/A) < 1.0 \qquad \text{Formula (1)}$$

$$(C/B) < 1.25 \qquad \text{Formula (2),}$$

wherein the polymer particles comprise a polymer of a feedstock monomer, and the polymer is not crosslinked by a polyfunctional monomer, or the content of the polyfunctional monomer in the feedstock monomer is 1.0% by mass or less based on the total amount of the feedstock monomer.

2. The polymer particles according to claim 1, wherein the polymer particles satisfy the following formula (3):

$$1.0 < (C/A) \leq 1.10 \qquad \text{Formula (3).}$$

3. The polymer particles according to claim 1, wherein the large particles having a particle diameter of 5 times or more the number average particle diameter of the polymer particles are contained by 0.1% or less on a number basis.

4. The polymer particles according to claim 1, wherein the polymer comprises an acrylic-based polymer.

5. A thickener comprising the polymer particles according to claim 1.

6. A composition comprising a dissolving medium and a solution of polymer particles,
wherein the polymer particles have a number average particle diameter of 1 to 50 μm and a coefficient of variation in a number-based particle size distribution of 30% or more,
wherein where the weight average molecular weight of the whole polymer particles is defined as A,
the weight average molecular weight of small particles having a cumulative number percentage of 5% or less counted from the smaller diameter side in the number-based particle size distribution of the polymer particles is defined as B, and
the weight average molecular weight of large particles having a particle diameter of 5 times or more the number average particle diameter of the polymer particles is defined as C,
the polymer particles satisfy the following formulas (1) and (2):

$$0.90 \leq (B/A) < 1.0 \qquad \text{Formula (1)}$$

$$(C/B) < 1.25 \qquad \text{Formula (2).}$$

7. The composition according to claim 6, further comprising a photopolymerization initiator.

* * * * *